(12) United States Patent
Betelia et al.

(10) Patent No.: US 12,471,939 B2
(45) Date of Patent: Nov. 18, 2025

(54) SHOCK WAVE CATHETER WITH RETRACTABLE ENCLOSURE

(71) Applicant: Shockwave Medical, Inc., Santa Clara, CA (US)

(72) Inventors: Rainier Betelia, San Jose, CA (US); Todd Weston Jenkins, San Jose, CA (US); Danielle Sheree Rond, Santa Clara, CA (US)

(73) Assignee: SHOCKWAVE MEDICAL, INC., Santa Clara, CA (US)

( * ) Notice: Subject to any disclaimer, the term of this patent is extended or adjusted under 35 U.S.C. 154(b) by 0 days.

(21) Appl. No.: 18/596,388

(22) Filed: Mar. 5, 2024

(65) Prior Publication Data

US 2025/0281191 A1 Sep. 11, 2025

(51) Int. Cl.
*A61B 17/22* (2006.01)
*A61M 25/10* (2013.01)
*A61B 17/00* (2006.01)

(52) U.S. Cl.
CPC .......... *A61B 17/22022* (2013.01); *A61B 2017/00336* (2013.01); *A61B 2017/22008* (2013.01); *A61B 2017/22025* (2013.01); *A61B 2017/22061* (2013.01); *A61M 25/104* (2013.01)

(58) Field of Classification Search
CPC .......... A61B 2017/22025; A61B 2017/22062; A61B 2017/22098; A61B 2017/22051; A61B 2017/00336; A61B 2017/22008; A61B 2017/22061; A61B 17/22022; A61B 17/22012; A61B 17/2202; A61B 17/22004; A61B 17/225; A61B 2090/0811; A61B 18/26; A61B 2018/263; A61N 7/00; A61M 25/104
See application file for complete search history.

(56) References Cited

U.S. PATENT DOCUMENTS

| | | | |
|---|---|---|---|
| 2,916,647 | A | 12/1959 | George |
| 3,412,288 | A | 11/1968 | Ostrander |
| 3,413,976 | A | 12/1968 | Roze |
| 3,524,101 | A | 8/1970 | Barbini |
| 3,583,766 | A | 6/1971 | Padberg |

(Continued)

FOREIGN PATENT DOCUMENTS

| | | |
|---|---|---|
| AU | 2009313507 B2 | 11/2014 |
| AU | 2013284490 B2 | 5/2018 |

(Continued)

OTHER PUBLICATIONS

International Search Report and Written Opinion received for International Patent Application No. PCT/US2024/019505 mailed on Dec. 3, 2024, 10 pages.

*Primary Examiner* — Anh T Dang
(74) *Attorney, Agent, or Firm* — Morrison & Foerster LLP

(57) ABSTRACT

A shock wave catheter for treating a lesion in a body lumen includes a shock wave emitter assembly and a retractable enclosure. In a first configuration of the catheter, the retractable enclosure is sealed to a distal member of the catheter and the lesion is treated by shock waves propagating through the enclosure wall. In a second configuration of the catheter, the retractable enclosure is retracted from the distal member of the catheter and the lesion is treated directly by shock waves emitted from the shock wave emitter assembly.

37 Claims, 8 Drawing Sheets

(56) References Cited

U.S. PATENT DOCUMENTS

| | | | |
|---|---|---|---|
| 3,785,382 A | 1/1974 | Schmidt-Kloiber et al. |
| 3,902,499 A | 9/1975 | Shene |
| 3,942,531 A | 3/1976 | Hoff et al. |
| 4,027,674 A | 6/1977 | Tessler et al. |
| 4,030,505 A | 6/1977 | Tessler |
| 4,445,509 A | 5/1984 | Auth |
| 4,662,126 A | 5/1987 | Malcolm |
| 4,662,375 A | 5/1987 | Hepp et al. |
| 4,671,254 A | 6/1987 | Fair |
| 4,685,458 A | 8/1987 | Leckrone |
| 4,741,405 A | 5/1988 | Moeny et al. |
| 4,809,682 A | 3/1989 | Forssmann et al. |
| 4,813,934 A | 3/1989 | Engelson et al. |
| 4,878,495 A | 11/1989 | Grayzei |
| 4,890,603 A | 1/1990 | Filler |
| 4,900,303 A | 2/1990 | Lemelson |
| 4,990,134 A | 2/1991 | Auth |
| 4,994,032 A | 2/1991 | Sugiyama et al. |
| 5,009,232 A | 4/1991 | Hassler et al. |
| 5,046,503 A | 9/1991 | Schneiderman |
| 5,057,103 A | 10/1991 | Davis |
| 5,057,106 A | 10/1991 | Kasevich et al. |
| 5,061,240 A | 10/1991 | Cherian |
| 5,078,717 A | 1/1992 | Parins et al. |
| 5,102,402 A | 4/1992 | Dror et al. |
| 5,103,804 A | 4/1992 | Abele et al. |
| 5,116,227 A | 5/1992 | Levy |
| 5,152,767 A | 10/1992 | Sypal et al. |
| 5,152,768 A | 10/1992 | Bhatta |
| 5,154,722 A | 10/1992 | Filip et al. |
| 5,176,675 A | 1/1993 | Watson et al. |
| 5,195,508 A | 3/1993 | Muller et al. |
| 5,245,988 A | 9/1993 | Einars et al. |
| 5,246,447 A | 9/1993 | Rosen et al. |
| 5,254,121 A | 10/1993 | Manevitz et al. |
| 5,281,231 A | 1/1994 | Rosen et al. |
| 5,295,958 A | 3/1994 | Shturman |
| 5,304,134 A | 4/1994 | Kraus et al. |
| 5,321,715 A | 6/1994 | Trost |
| 5,324,255 A | 6/1994 | Passafaro et al. |
| 5,336,234 A | 8/1994 | Vigil et al. |
| 5,362,309 A | 11/1994 | Carter |
| 5,364,393 A | 11/1994 | Auth et al. |
| 5,368,591 A | 11/1994 | Lennox et al. |
| 5,395,335 A | 3/1995 | Jang |
| 5,417,208 A | 5/1995 | Winkler |
| 5,425,735 A | 6/1995 | Rosen et al. |
| 5,454,809 A | 10/1995 | Janssen |
| 5,472,406 A | 12/1995 | de la Torre et al. |
| 5,582,578 A | 12/1996 | Zhong et al. |
| 5,584,843 A | 12/1996 | Wulfman et al. |
| 5,603,731 A | 2/1997 | Whitney |
| 5,609,606 A | 3/1997 | O'Boyle |
| 5,662,590 A | 9/1997 | de la Torre et al. |
| 5,709,676 A | 1/1998 | Alt |
| 5,846,218 A | 12/1998 | Brisken et al. |
| 5,891,089 A | 4/1999 | Katz et al. |
| 5,893,840 A | 4/1999 | Hull et al. |
| 5,931,805 A | 8/1999 | Brisken |
| 6,007,530 A | 12/1999 | Dornhofer et al. |
| 6,033,371 A | 3/2000 | Torre et al. |
| 6,056,722 A | 5/2000 | Jayaraman |
| 6,080,119 A | 6/2000 | Schwarze et al. |
| 6,083,232 A | 7/2000 | Cox |
| 6,090,104 A | 7/2000 | Webster et al. |
| 6,113,560 A | 9/2000 | Simnacher |
| 6,132,444 A | 10/2000 | Shturman et al. |
| 6,146,358 A | 11/2000 | Rowe |
| 6,186,963 B1 | 2/2001 | Schwarze et al. |
| 6,210,408 B1 | 4/2001 | Chandrasekaran et al. |
| 6,215,734 B1 | 4/2001 | Moeny et al. |
| 6,217,531 B1 | 4/2001 | Reitmajer |
| 6,267,747 B1 | 7/2001 | Samson et al. |
| 6,277,138 B1 | 8/2001 | Levinson et al. |
| 6,287,272 B1 | 9/2001 | Brisken et al. |
| 6,352,535 B1 | 3/2002 | Lewis et al. |
| 6,364,894 B1 | 4/2002 | Healy et al. |
| 6,367,203 B1 | 4/2002 | Graham et al. |
| 6,371,971 B1 | 4/2002 | Tsugita et al. |
| 6,398,792 B1 | 6/2002 | O'Connor |
| 6,406,486 B1 | 6/2002 | de la Torre et al. |
| 6,440,124 B1 | 8/2002 | Esch et al. |
| 6,494,890 B1 | 12/2002 | Shturman et al. |
| 6,514,203 B2 | 2/2003 | Bukshpan |
| 6,524,251 B2 | 2/2003 | Rabiner et al. |
| 6,589,253 B1 | 7/2003 | Cornish et al. |
| 6,607,003 B1 | 8/2003 | Wilson |
| 6,638,246 B1 | 10/2003 | Naimark et al. |
| 6,652,547 B2 | 11/2003 | Rabiner et al. |
| 6,666,834 B2 | 12/2003 | Restle et al. |
| 6,689,089 B1 | 2/2004 | Tiedtke et al. |
| 6,736,784 B1 | 5/2004 | Menne et al. |
| 6,740,081 B2 | 5/2004 | Hilal |
| 6,755,821 B1 | 6/2004 | Fry |
| 6,939,320 B2 | 9/2005 | Lennox |
| 6,989,009 B2 | 1/2006 | Lafontaine |
| 7,066,904 B2 | 6/2006 | Rosenthal et al. |
| 7,087,061 B2 | 8/2006 | Chernenko et al. |
| 7,241,295 B2 | 7/2007 | Maguire |
| 7,309,324 B2 | 12/2007 | Hayes et al. |
| 7,389,148 B1 | 6/2008 | Morgan |
| 7,505,812 B1 | 3/2009 | Eggers et al. |
| 7,569,032 B2 | 8/2009 | Naimark et al. |
| 7,850,685 B2 | 12/2010 | Kunis et al. |
| 7,853,332 B2 | 12/2010 | Olsen et al. |
| 7,873,404 B1 | 1/2011 | Patton |
| 7,951,111 B2 | 5/2011 | Drasler et al. |
| 8,162,859 B2 | 4/2012 | Schultheiss et al. |
| 8,177,801 B2 | 5/2012 | Kallok et al. |
| 8,353,923 B2 | 1/2013 | Shturman |
| 8,556,813 B2 | 10/2013 | Cioanta et al. |
| 8,574,247 B2 | 11/2013 | Adams et al. |
| 8,728,091 B2 | 5/2014 | Hakala et al. |
| 8,747,416 B2 | 6/2014 | Hakala et al. |
| 8,888,788 B2 | 11/2014 | Hakala et al. |
| 8,956,371 B2 | 2/2015 | Hawkins et al. |
| 8,956,374 B2 | 2/2015 | Hawkins et al. |
| 9,005,216 B2 | 4/2015 | Hakala et al. |
| 9,011,462 B2 | 4/2015 | Adams et al. |
| 9,011,463 B2 | 4/2015 | Adams et al. |
| 9,044,618 B2 | 6/2015 | Hawkins et al. |
| 9,044,619 B2 | 6/2015 | Hawkins et al. |
| 9,072,534 B2 | 7/2015 | Hakala et al. |
| 9,138,249 B2 | 9/2015 | Adams et al. |
| 9,198,825 B2 | 12/2015 | Katragadda et al. |
| 9,333,000 B2 | 5/2016 | Hakala et al. |
| 9,421,025 B2 | 8/2016 | Hawkins et al. |
| 9,433,428 B2 | 9/2016 | Hakala et al. |
| 9,522,012 B2 | 12/2016 | Adams |
| 9,642,673 B2 | 5/2017 | Adams et al. |
| 9,993,292 B2 | 6/2018 | Adams et al. |
| 10,039,561 B2 | 8/2018 | Adams et al. |
| 10,118,015 B2 | 11/2018 | De La Rama et al. |
| 10,149,690 B2 | 12/2018 | Hawkins et al. |
| 10,154,799 B2 | 12/2018 | Van Der Weide et al. |
| 10,159,505 B2 | 12/2018 | Hakala et al. |
| 10,206,698 B2 | 2/2019 | Hakala et al. |
| 10,517,620 B2 | 12/2019 | Adams |
| 10,517,621 B1 | 12/2019 | Adams |
| 10,555,744 B2 | 2/2020 | Nguyen et al. |
| 10,682,178 B2 | 6/2020 | Adams et al. |
| 10,702,293 B2 | 7/2020 | Hawkins et al. |
| 10,709,462 B2 | 7/2020 | Nguyen et al. |
| 10,959,743 B2 | 3/2021 | Adams et al. |
| 10,966,737 B2 | 4/2021 | Nguyen |
| 10,973,538 B2 | 4/2021 | Hakala et al. |
| 11,000,299 B2 | 5/2021 | Hawkins et al. |
| 11,076,874 B2 | 8/2021 | Hakala et al. |
| 11,337,713 B2 | 5/2022 | Nguyen et al. |
| 11,432,834 B2 | 9/2022 | Adams |
| 11,478,261 B2 | 10/2022 | Nguyen |
| 11,534,187 B2 | 12/2022 | Bonutti |
| 11,596,423 B2 | 3/2023 | Nguyen et al. |
| 11,596,424 B2 | 3/2023 | Hakala et al. |

(56) References Cited

U.S. PATENT DOCUMENTS

| | | | |
|---|---|---|---|
| 11,622,780 B2 | 4/2023 | Nguyen et al. |
| 11,696,799 B2 | 7/2023 | Adams et al. |
| 11,771,449 B2 | 10/2023 | Adams et al. |
| 2001/0044596 A1 | 11/2001 | Jaafar |
| 2002/0045890 A1 | 4/2002 | Celliers et al. |
| 2002/0082553 A1 | 6/2002 | Duchamp |
| 2002/0177889 A1 | 11/2002 | Brisken et al. |
| 2003/0004434 A1 | 1/2003 | Greco et al. |
| 2003/0176873 A1 | 9/2003 | Chernenko et al. |
| 2003/0229370 A1 | 12/2003 | Miller |
| 2004/0006333 A1 | 1/2004 | Arnold et al. |
| 2004/0010249 A1 | 1/2004 | Truckai et al. |
| 2004/0044308 A1 | 3/2004 | Naimark et al. |
| 2004/0097963 A1 | 5/2004 | Seddon |
| 2004/0097996 A1 | 5/2004 | Rabiner et al. |
| 2004/0162508 A1 | 8/2004 | Uebelacker |
| 2004/0249401 A1 | 12/2004 | Rabiner et al. |
| 2004/0254570 A1 | 12/2004 | Hadjicostis et al. |
| 2005/0015953 A1 | 1/2005 | Keidar |
| 2005/0021013 A1 | 1/2005 | Visuri et al. |
| 2005/0059965 A1 | 3/2005 | Eberl et al. |
| 2005/0075662 A1 | 4/2005 | Pedersen et al. |
| 2005/0090888 A1 | 4/2005 | Hines et al. |
| 2005/0113722 A1 | 5/2005 | Schultheiss |
| 2005/0113822 A1 | 5/2005 | Fuimaono et al. |
| 2005/0171527 A1 | 8/2005 | Bhola |
| 2005/0228372 A1 | 10/2005 | Truckai et al. |
| 2005/0245866 A1 | 11/2005 | Azizi |
| 2005/0251131 A1 | 11/2005 | Lesh |
| 2006/0004286 A1 | 1/2006 | Chang et al. |
| 2006/0069424 A1 | 3/2006 | Acosta et al. |
| 2006/0074484 A1 | 4/2006 | Huber |
| 2006/0184076 A1 | 8/2006 | Gill et al. |
| 2006/0190022 A1 | 8/2006 | Beyar et al. |
| 2006/0221528 A1 | 10/2006 | Li et al. |
| 2007/0016112 A1 | 1/2007 | Schultheiss et al. |
| 2007/0088380 A1 | 4/2007 | Hirszowicz et al. |
| 2007/0129667 A1 | 6/2007 | Tiedtke et al. |
| 2007/0156129 A1 | 7/2007 | Kovalcheck |
| 2007/0239082 A1 | 10/2007 | Schultheiss et al. |
| 2007/0239253 A1 | 10/2007 | Jagger et al. |
| 2007/0244423 A1 | 10/2007 | Zumeris et al. |
| 2007/0250052 A1 | 10/2007 | Wham |
| 2007/0255270 A1 | 11/2007 | Carney |
| 2007/0282301 A1 | 12/2007 | Segalescu et al. |
| 2007/0299481 A1 | 12/2007 | Syed et al. |
| 2008/0097251 A1 | 4/2008 | Babaev |
| 2008/0188913 A1 | 8/2008 | Stone et al. |
| 2009/0041833 A1 | 2/2009 | Bettinger et al. |
| 2009/0171278 A1* | 7/2009 | Hirszowicz ......... A61M 25/104 604/509 |
| 2009/0227992 A1 | 9/2009 | Nir et al. |
| 2009/0230822 A1 | 9/2009 | Kushculey et al. |
| 2009/0247945 A1 | 10/2009 | Levit et al. |
| 2009/0254114 A1 | 10/2009 | Hirszowicz et al. |
| 2009/0299447 A1 | 12/2009 | Jensen et al. |
| 2010/0016862 A1 | 1/2010 | Hawkins et al. |
| 2010/0036294 A1 | 2/2010 | Mantell et al. |
| 2010/0094209 A1 | 4/2010 | Drasler et al. |
| 2010/0114020 A1 | 5/2010 | Hawkins et al. |
| 2010/0114065 A1 | 5/2010 | Hawkins et al. |
| 2010/0121322 A1 | 5/2010 | Swanson |
| 2010/0179424 A1 | 7/2010 | Warnking et al. |
| 2010/0286709 A1 | 11/2010 | Diamant et al. |
| 2010/0305565 A1 | 12/2010 | Truckai et al. |
| 2011/0034832 A1 | 2/2011 | Cioanta et al. |
| 2011/0118634 A1 | 5/2011 | Golan |
| 2011/0208185 A1 | 8/2011 | Diamant et al. |
| 2011/0257523 A1 | 10/2011 | Hastings et al. |
| 2011/0295227 A1 | 12/2011 | Hawkins et al. |
| 2012/0071889 A1 | 3/2012 | Mantell et al. |
| 2012/0095461 A1 | 4/2012 | Herscher et al. |
| 2012/0116289 A1 | 5/2012 | Hawkins et al. |
| 2012/0143177 A1 | 6/2012 | Avitall et al. |
| 2012/0157991 A1 | 6/2012 | Christian |
| 2012/0203255 A1 | 8/2012 | Hawkins et al. |
| 2012/0253358 A1 | 10/2012 | Golan et al. |
| 2013/0030431 A1 | 1/2013 | Adams |
| 2013/0041355 A1 | 2/2013 | Heeren et al. |
| 2013/0116714 A1 | 5/2013 | Adams et al. |
| 2013/0123694 A1 | 5/2013 | Subramaniyan et al. |
| 2013/0150874 A1 | 6/2013 | Kassab |
| 2013/0253622 A1 | 9/2013 | Hooven |
| 2014/0046229 A1 | 2/2014 | Hawkins et al. |
| 2014/0214061 A1 | 7/2014 | Adams et al. |
| 2015/0320432 A1 | 11/2015 | Adams |
| 2016/0151081 A1 | 6/2016 | Adams et al. |
| 2016/0324534 A1 | 11/2016 | Hawkins et al. |
| 2017/0135709 A1 | 5/2017 | Nguyen et al. |
| 2017/0311965 A1 | 11/2017 | Adams |
| 2018/0008348 A1* | 1/2018 | Grace ................. A61B 18/245 |
| 2018/0153568 A1* | 6/2018 | Kat-Kuoy ........ A61B 17/22022 |
| 2019/0142453 A1* | 5/2019 | Efremkin ....... A61B 17/320068 606/7 |
| 2019/0159792 A1* | 5/2019 | Panian ................ A61M 25/104 |
| 2020/0330143 A1* | 10/2020 | Walzman ........... A61B 17/2202 |
| 2021/0085383 A1 | 3/2021 | Vo et al. |
| 2021/0338258 A1 | 11/2021 | Hawkins et al. |
| 2022/0015785 A1 | 1/2022 | Hakala et al. |
| 2022/0240958 A1 | 8/2022 | Nguyen et al. |
| 2023/0043475 A1 | 2/2023 | Adams |
| 2023/0107690 A1 | 4/2023 | Nguyen |
| 2023/0165598 A1 | 6/2023 | Nguyen et al. |
| 2023/0293197 A1 | 9/2023 | Nguyen et al. |
| 2023/0310073 A1 | 10/2023 | Adams et al. |
| 2023/0329731 A1 | 10/2023 | Hakala et al. |
| 2023/0380849 A1 | 11/2023 | Adams et al. |

FOREIGN PATENT DOCUMENTS

| | | |
|---|---|---|
| CA | 2104414 A1 | 2/1995 |
| CN | 1204242 A | 1/1999 |
| CN | 1269708 A | 10/2000 |
| CN | 1942145 A | 4/2007 |
| CN | 101043914 A | 9/2007 |
| CN | 102057422 A | 5/2011 |
| CN | 102271748 A | 12/2011 |
| CN | 102355856 A | 2/2012 |
| CN | 102765785 A | 11/2012 |
| CN | 203564304 U | 4/2014 |
| CN | 113332568 B | 7/2022 |
| DE | 3038445 A1 | 5/1982 |
| DE | 202006014285 U1 | 12/2006 |
| EP | 0442199 A2 | 8/1991 |
| EP | 0571306 A1 | 11/1993 |
| EP | 623360 A1 | 11/1994 |
| EP | 0647435 A1 | 4/1995 |
| EP | 2253884 A1 | 11/2010 |
| EP | 2362798 B1 | 4/2014 |
| JP | S62-099210 U | 6/1987 |
| JP | S62-275446 A | 11/1987 |
| JP | H03-63059 A | 3/1991 |
| JP | H06-125915 A | 5/1994 |
| JP | H07-47135 A | 2/1995 |
| JP | H08-89511 A | 4/1996 |
| JP | H10-99444 A | 4/1998 |
| JP | H10-314177 A | 12/1998 |
| JP | H10-513379 A | 12/1998 |
| JP | 2002538932 A | 11/2002 |
| JP | 2004081374 A | 3/2004 |
| JP | 2004357792 A | 12/2004 |
| JP | 2005501597 A | 1/2005 |
| JP | 2005095410 A | 4/2005 |
| JP | 2005515825 A | 6/2005 |
| JP | 2006516465 A | 7/2006 |
| JP | 2007289707 A | 11/2007 |
| JP | 2007532182 A | 11/2007 |
| JP | 2008506447 A | 3/2008 |
| JP | 2011513694 A | 4/2011 |
| JP | 2011520248 A | 7/2011 |
| JP | 2011524203 A | 9/2011 |
| JP | 2011528963 A | 12/2011 |
| JP | 2012505050 A | 3/2012 |
| JP | 2012508042 A | 4/2012 |

(56) References Cited

FOREIGN PATENT DOCUMENTS

| | | | |
|---|---|---|---|
| JP | 2015525657 A | 9/2015 | |
| JP | 2015528327 A | 9/2015 | |
| JP | 6029828 B2 | 11/2016 | |
| JP | 6081510 B2 | 2/2017 | |
| WO | WO-1989011307 A1 | 11/1989 | |
| WO | WO-1996024297 A1 | 8/1996 | |
| WO | WO-1998009571 A1 | 3/1998 | |
| WO | WO-1999000060 A1 | 1/1999 | |
| WO | WO-1999002096 A1 | 1/1999 | |
| WO | WO-2000056237 A2 | 9/2000 | |
| WO | WO-2004069072 A2 | 8/2004 | |
| WO | WO-2005099594 A1 | 10/2005 | |
| WO | WO-2005102199 A1 | 11/2005 | |
| WO | WO-2006006169 A2 | 1/2006 | |
| WO | WO-2006127158 A2 | 11/2006 | |
| WO | WO-2007088546 A2 | 8/2007 | |
| WO | WO-2007149905 A2 | 12/2007 | |
| WO | WO-2009121017 A1 | 10/2009 | |
| WO | WO-2009126544 A1 | 10/2009 | |
| WO | WO-2009136268 A1 | 11/2009 | |
| WO | WO-2009152352 A2 | 12/2009 | |
| WO | WO-2010014515 A2 | 2/2010 | |
| WO | WO-2010054048 A2 | 9/2010 | |
| WO | WO-2011006017 A1 | 1/2011 | |
| WO | WO-2011094111 A2 | 8/2011 | |
| WO | WO-2011143468 A2 | 11/2011 | |
| WO | WO-2012025833 A2 | 3/2012 | |
| WO | WO-2013059735 A1 | 4/2013 | |
| WO | WO-2014025397 A1 | 2/2014 | |
| WO | WO-2014025620 A1 | 2/2014 | |
| WO | WO-2015017499 A1 | 2/2015 | |
| WO | WO-2019099218 A1 | 5/2019 | |

* cited by examiner

SHOCK WAVE CATHETER WITH RETRACTABLE ENCLOSURE

FIELD OF THE DISCLOSURE

The present disclosure relates generally to the field of medical devices and methods, and more specifically to shock wave catheter devices for treating calcified lesions in body lumens, such as calcified lesions and occlusions in vasculature and kidney stones in the urinary system.

BACKGROUND

A wide variety of catheters have been developed for treating calcified lesions, such as calcified lesions in vasculature associated with arterial disease. For example, treatment systems for percutaneous coronary angioplasty or peripheral angioplasty use angioplasty balloons to dilate a calcified lesion and restore normal blood flow in a vessel. In these types of procedures, a catheter carrying a balloon is advanced into the vasculature along a guide wire until the balloon is aligned with calcified plaques. The balloon is then pressurized (normally to greater than 10 atm), causing the balloon to expand in a vessel to push calcified plaques back into the vessel wall and dilate occluded regions of vasculature.

More recently, the technique and treatment of intravascular lithotripsy (IVL) has been developed, which is an interventional procedure to modify calcified plaque in diseased arteries. The mechanism of plaque modification is through use of a catheter having one or more acoustic shock wave generating sources located within a liquid that can generate acoustic shock waves that modify the calcified plaque. IVL devices vary in design with respect to the energy source used to generate the acoustic shock waves, with two exemplary energy sources being electrohydraulic generation and laser generation.

For electrohydraulic generation of acoustic shock waves, a conductive solution (e.g., saline) may be contained within an enclosure that surrounds electrodes or can be flushed through a tube that surrounds the electrodes. The calcified plaque modification is achieved by creating acoustic shock waves within the catheter by an electrical discharge across the electrodes. This discharge creates one or more rapidly expanding vapor bubbles that generate the acoustic shock waves. These shock waves propagate radially outward and modify calcified plaque within the blood vessels. For laser generation of acoustic shock waves, a laser pulse is transmitted into and absorbed by a fluid within the catheter. This absorption process rapidly heats and vaporizes the fluid, thereby generating the rapidly expanding vapor bubble, as well as the acoustic shock waves that propagate outward and modify the calcified plaque. The acoustic shock wave intensity is higher if a fluid is chosen that exhibits strong absorption at the laser wavelength that is employed. These examples of IVL devices are not intended to be a comprehensive list of potential energy sources to create IVL shock waves.

The IVL process may be considered different from standard atherectomy procedures in that it cracks calcium but does not liberate the cracked calcium from the tissue. Hence, generally speaking, IVL should not require aspiration or embolic protection. Further, due to the compliance of a normal blood vessel and non-calcified plaque, the shock waves produced by IVL do not modify the normal vessel tissue or non-calcified plaque. Moreover, IVL does not carry the same degree of risk of perforation, dissection, or other damage to vasculature as atherectomy procedures or angioplasty procedures using cutting or scoring balloons.

More specifically, catheters to deliver IVL therapy have been developed that include pairs of electrodes for electrohydraulically generating shock waves inside an angioplasty balloon. Shock wave devices can be particularly effective for treating calcified plaque lesions because the acoustic pressure from the shock waves can crack and disrupt lesions near the angioplasty balloon without harming the surrounding tissue. In these devices, the catheter is advanced over a guidewire through a patient's vasculature until it is positioned proximal to and/or aligned with a calcified plaque lesion in a body lumen. The balloon is then inflated with conductive fluid (using a relatively low pressure of 2-4 atm) so that the balloon expands to contact the lesion but is not an inflation pressure that substantively displaces the lesion. Voltage pulses can then be applied across the electrodes of the electrode pairs to produce acoustic shock waves that propagate through the walls of the angioplasty balloon and into the lesions. Once the lesions have been cracked by the acoustic shock waves, the balloon can be expanded further to increase the cross-sectional area of the lumen and improve blood flow through the lumen. Alternative devices to deliver IVL therapy can be within a closed volume other than an angioplasty balloon, such as a cap, balloons of variable compliancy, or other enclosure.

To date, commercially available IVL catheters have included shock wave emitters housed within an angioplasty balloon. While effective for treating calcified lesions, improvements to IVL catheters may be necessary to target other tissue types (e.g., fibrotic or thrombotic masses) or lesions with multiple tissue types. Further, for treating lesions other than stenotic lesions (e.g., blood clots, fibrotic tissue within anastomosis, or cancer tumors), employing an angioplasty balloon or another kind of enclosure may not be necessary.

SUMMARY

Described herein are devices and methods for generating shock waves in a body lumen. In some embodiments, a shock wave catheter includes, at its distal region, a retractable enclosure configured to enclose a shock wave emitter assembly in a closed configuration or to expose the shock wave emitter assembly to the vasculature (e.g., bloodstream) in an open configuration. In some embodiments, the catheter includes perfusion capabilities for circulating fluid at the treatment site.

According to an aspect of the disclosure, a catheter for emitting shock waves in a body lumen is provided, the catheter comprising: a distal member; a slidable elongate member having a proximal end and a distal end; an inner elongate member located at least partially inside of the slidable elongate member and extending to the distal member; a shock wave emitter assembly located on the inner elongate member and in a more distal location than the distal end of the slidable elongate member; and a retractable enclosure having a distal end, where: in a closed configuration, the distal end of the retractable enclosure extends to the distal member of the catheter, and in an open configuration, the distal end of the retractable enclosure is retracted from the distal member of the catheter.

In some aspects, the catheter further comprises a proximal handle having a switch that is operably coupled with the retractable enclosure to move the retractable membrane between the closed configuration and the open configuration. In some aspects, in the closed configuration, the distal end of the retractable enclosure and the distal member of the catheter form a seal. In some aspects, the distal member comprises an expandable member, the distal end of the retractable enclosure comprises a polymeric liner, and, in the closed configuration, the seal is formed between the expandable member and the polymeric liner. In some aspects, the polymeric liner comprises a polytetrafluoroethylene. In some aspects, in the closed configuration, the catheter further comprises a chamber surrounding the shock wave emitter assembly and having an internal pressure no less than 1 atm. In some aspects, the distal member comprises an expandable member located distally of the retractable enclosure. In some aspects, the retractable enclosure comprises at least one of polyether block amide, nylon, thermoplastic polyurethane, fluorinated ethylene propylene, and polytetrafluoroethylene. In some aspects, the distal member comprises an elastic tip. In some aspects, the catheter further comprises at least one fluid lumen having a distal opening adjacent the shock wave emitter assembly. In some aspects, in the open configuration, the distal end of the retractable enclosure is spaced apart from the distal member of the catheter by a distance greater than or equal to 5 mm. In some aspects, in the open configuration, the distal end of the retractable enclosure is at least partially located proximally of the shock wave emitter assembly.

According to an aspect of the disclosure, a catheter for emitting shock waves in a body lumen is provided, the catheter comprising: a distal portion; an elongate member extending to the distal portion; a shock wave emitter assembly located on the elongate member; and a retractable enclosure having a distal end opening, where: in a closed configuration, the distal end opening of the retractable enclosure extends to the distal portion, and in an open configuration, the distal end opening of the retractable enclosure is retracted from the distal portion.

In some aspects, the retractable enclosure comprises an angioplasty balloon. In some aspects, the distal end opening of the retractable enclosure includes an inner diameter no less than a maximum outer diameter of the shock wave emitter assembly. In some aspects, the distal end opening of the retractable enclosure includes an inner diameter no less than 5 mm. In some aspects, the catheter further comprises a proximal handle having a switch that is operably coupled with the retractable enclosure to move the retractable enclosure between the closed configuration and the open configuration. In some aspects, in the closed configuration, the distal end opening of the retractable enclosure and the distal member of the catheter form a seal. In some aspects, the distal member comprises an expandable member, the distal end opening of the retractable enclosure comprises a polymeric liner, and, in the closed configuration, the expandable member and the polymeric liner form the seal. In some aspects, the polymeric liner comprises polytetrafluoroethylene. In some aspects, in the closed configuration, the retractable enclosure surrounds the shock wave emitter assembly and has an internal pressure no less than 1 atm and no more than 4 atm. In some aspects, the retractable enclosure comprises at least one of polyether block amide and polytetrafluoroethylene. In some aspects, the distal member comprises an elastic tip. In some aspects, the catheter further comprises at least one fluid lumen having a distal opening adjacent the shock wave emitter assembly. In some aspects, in the open configuration, the distal end opening of the retractable enclosure is spaced apart from the distal member of the catheter by a distance greater than or equal to 5 mm. In some aspects, in the open configuration, the distal end opening of the retractable enclosure is at least partially located proximally of the shock wave emitter assembly.

According to an aspect of the disclosure, a catheter for treating a lesion in a body lumen is provided, the catheter comprising: a distal member; an elongate member; a shock wave emitter assembly located at a distal region of the elongate member; a retractable enclosure having a distal end and configured to be retractably coupled to the distal member; and a proximal handle having a switch and located at a proximal end of the elongate member, where: when the switch is in a closed setting, the retractable enclosure is sealed to the distal member, and, when the switch is in an open setting, the retractable enclosure is spaced from the distal member.

In some aspects, the elongate member comprises a first lumen and the proximal handle comprises a first port in fluid communication with the first lumen. In some aspects, the elongate member further comprises a second lumen and the proximal handle further comprises a second port in fluid communication with the second lumen. In some aspects, the proximal handle further comprises a second port in fluid communication with the first lumen.

According to an aspect of the disclosure, a method of generating shock waves in a body lumen is provided, the method comprising: advancing a shock wave catheter through a body lumen, the shock wave catheter having: a distal member; an elongate member; a shock wave emitter assembly located at a distal region of the elongate member; and a retractable enclosure having a distal end and configured to be retractably coupled to the distal member; positioning the shock wave emitter assembly adjacent a treatment site; retracting the retractable enclosure; and generating one or more shock waves at the shock wave emitter assembly.

In some aspects, the method further comprises closing the retractable enclosure such that the distal end of the retractable enclosure is sealed to the distal member. In some aspects, an inner surface of the retractable enclosure comprises a polymeric liner that forms a fluid-tight seal with the distal member when the retractable enclosure and the distal member are coupled. In some aspects, the method further comprises depressurizing a chamber of the retractable enclosure such that a fluid-tight seal between the distal member and the retractable enclosure is broken. In some aspects, the method further comprises imaging the treatment site by one or more of x-ray fluoroscopy, intravascular ultrasound, and optical coherence tomography. In some aspects, the method further comprises, based on imaging data, determining whether to generate shock waves with the retractable enclosure retracted or with the retractable enclosure sealed to the distal member.

According to an aspect of the disclosure, a method of generating shock waves is provided, the method comprising: advancing a shock wave catheter through a body lumen, the shock wave catheter having a shock wave emitter assembly; applying a first energy pulse to the shock wave emitter assembly to generate a first shock wave having a first sonic output; and after applying the first energy pulse, applying a second energy pulse having the same power as the first energy pulse to the shock wave emitter assembly to generate a second shock wave having a second sonic output that is greater than the first sonic output.

In some aspects, the shock wave catheter comprises a distal member, an elongate member, and a retractable enclosure having a distal end and configured to be retractably coupled to the distal member. In some aspects, the method further comprises, between applying the first energy pulse and applying the second energy pulse, retracting the retractable enclosure such that the retractable enclosure does not cover the shock wave emitter assembly.

According to an aspect of the disclosure, a catheter system for generating shock waves is provided, the catheter system comprising: a power source configured to generate a plurality of energy pulses, each energy pulse having a predetermined power; and a catheter comprising a shock wave emitter assembly and an elongate energy guide extending from the power source to the shock wave emitter assembly, where, in a first setting of the catheter system, the shock wave emitter assembly generates a first shock wave having a first sonic output when a first energy pulse of the plurality of energy pulses is applied to the shock wave emitter assembly, and, in a second setting of the catheter system, the shock wave emitter assembly generates a second shock wave having a second sonic output greater than the first sonic output when a second energy pulse of the plurality of energy pulses is applied to the shock wave emitter assembly.

In some aspects, the catheter further comprises a distal member and a retractable enclosure that, in the first setting, is sealed to the distal member so as to define a chamber and, in the second setting, is spaced from the distal member.

According to an aspect of the disclosure, a method of generating shock waves is provided, the method comprising: advancing a shock wave catheter through a body lumen, the shock wave catheter having a shock wave emitter assembly and a retractable enclosure; applying a first energy pulse to the shock wave emitter assembly to generate a first shock wave having a first sonic output; if the retractable enclosure is in a closed configuration, retracting the enclosure to expose the shock wave emitter assembly, or, if the retractable enclosure is in an open configuration, closing the retractable enclosure to enclose the shock wave emitter assembly; and applying a second energy pulse having a different power than the first energy pulse to the shock wave emitter assembly to generate a second shock wave.

DESCRIPTION OF THE FIGURES

Illustrative aspects of the present disclosure are described in detail below with reference to the following figures. It is intended that the embodiments and figures disclosed herein are to be considered illustrative and exemplary rather than restrictive.

DETAILED DESCRIPTION

Figure 1:
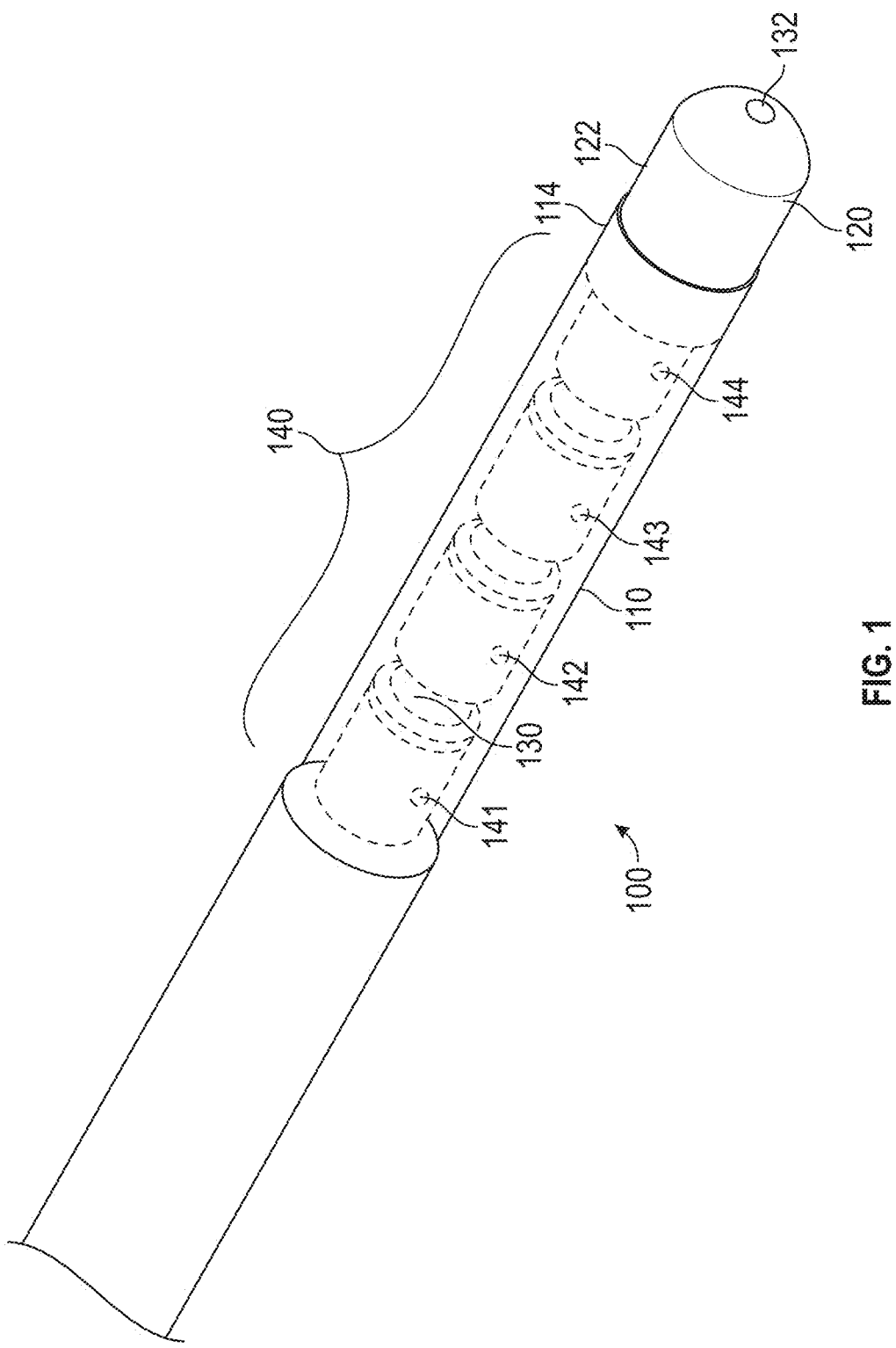
FIG. 1 illustrates a perspective view of an exemplary shock wave catheter having a retractable member, according to aspects of the disclosure.

The following description is presented to enable a person of ordinary skill in the art to make and use the various embodiments and aspects thereof disclosed herein. Descriptions of specific devices, assemblies, techniques, and applications are provided only as examples. Various modifications to the examples described herein will be readily apparent to those of ordinary skill in the art, and the general principles described herein may be applied to other examples and applications without departing from the spirit and scope of the various embodiments and aspects thereof. Thus, the various embodiments and aspects thereof are not intended to be limited to the examples described herein and shown but are to be accorded the scope consistent with the claims.

Efforts have been made to improve the design of electrode assemblies included in shock wave and directed cavitation catheters. For instance, low-profile electrode assemblies have been developed that reduce the crossing profile of a catheter and allow the catheter to more easily navigate calcified vessels to deliver shock waves in more severely occluded regions of vasculature. Examples of low-profile electrode designs can be found in U.S. Pat. Nos. 8,888,788, 9,433,428, and 10,709,462, and in U.S. Publication No. 2021/0085383, all of which are incorporated herein by reference in their entireties. Other catheter designs have improved the delivery of shock waves, for instance, by specific electrode construction and configuration thereby directing shock waves in a forward direction to break up tighter and harder-to-cross occlusions in vasculature. Examples of forward-firing catheter designs can be found in U.S. Pat. Nos. 10,966,737, 11,478,261, and 11,596,423, and in U.S. Publication Nos. 2023/0107690 and 2023/0165598, all of which are incorporated herein by reference in their entireties.

As used herein, the term "electrode" refers to an electrically conducting element (typically made of metal) that receives electrical current and subsequently releases the electrical current to another electrically conducting element. In the context of the present disclosure, electrodes are often positioned relative to each other, such as in an arrangement of an inner electrode and an outer electrode. Accordingly, as used herein, the term "electrode pair" refers to two electrodes that are positioned adjacent to each other such that application of a sufficiently high voltage to the electrode pair will cause an electrical current to transmit across the gap (also referred to as a "spark gap") between the two electrodes (e.g., from an inner electrode to an outer electrode, or vice versa, optionally with the electricity passing through a conductive fluid or gas therebetween). In some contexts, one or more electrode pairs may also be referred to as an electrode assembly. In the context of the present disclosure, the term "emitter" broadly refers to the region of an electrode assembly where the current transmits across the electrode pair, generating a shock wave. The terms "emitter sheath" and "emitter band" refer to a continuous or discontinuous band of conductive material that may form one or more electrodes of one or more electrode pairs, thereby forming a location of one or more emitters.

FIG. 1 illustrates a distal region of a shock wave catheter 100 having a retractable enclosure 110, according to one or more aspects of the disclosure. The retractable enclosure 110 may include a distal sealing region 114. An inner surface of the distal sealing region 114 may include a polymeric liner. The polymeric liner may be made of a lubricious material such as polytetrafluoroethylene (PTFE). According to some embodiments, the catheter 100 has a distal member 120, which includes an expandable member 122 that, when in a closed configuration, expands in response to an internal pressure increase within the retractable enclosure 110. The expandable member 122 may be sized such that it snugly fits in the distal sealing region 114 in the closed configuration and then volumetrically expands when the pressure within the retractable enclosure 110 is increased. When the expandable member 122 is in an expanded state as illustrated in FIG. 1, a fluid-tight seal is maintained between the distal member 120 and the distal sealing region 114 of the retractable enclosure 110. The expandable member 122 may be made of a compliant material. The expandable member 122 may be made of a low durometer material. In some embodiments, the distal member 120 includes an atraumatic, rounded, elastic tip.

In one or more embodiments, catheter 100 includes an elongate member 130 that extends from a proximal region (not shown in FIG. 1) to the distal member 120. In some embodiments, elongate member 130 includes one or more fluid lumens (e.g., to supply fluid for expanding the expandable member 122). The elongate member 130 may include a guidewire lumen 132 that extends to the distal member 122 of the distal member 120.

Catheter 100 includes a shock wave emitter assembly 140, which is connected by one or more energy guides (e.g., electrical wires or optical fibers) to a power source (e.g., a high voltage power supply or a light energy source). In some embodiments, the shock wave emitter assembly 140 includes one or more emitters 141, 142, 143, 144. Each of the one or more emitters 141, 142, 143, 144 may include one or more electrode pairs. When a sufficient voltage is applied across an electrode pair, a shock wave may be generated at the electrode pair. Each of these electrode pairs may be electrically connected (e.g., in series or in parallel) to one or more electrode pairs of one or more emitters. Accordingly, one high voltage pulse from a high voltage power source may generate multiple shock waves from catheter 100. In some embodiments, one or more emitters are separately connected to a power source (e.g., by multiple channels) so that a single high voltage pulse at one channel only generates shock waves from emitters electrically connected to the one channel.

Figure 2A:
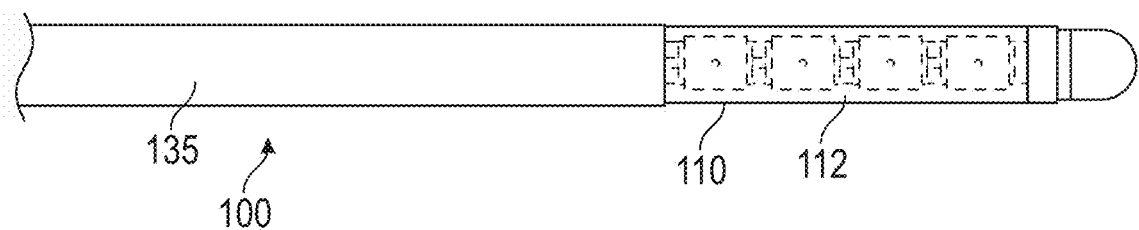
FIG. 2A illustrates a side view of an exemplary shock wave catheter having a retractable member in a sealed (closed) configuration, according to aspects of the disclosure.
Figure 2B:
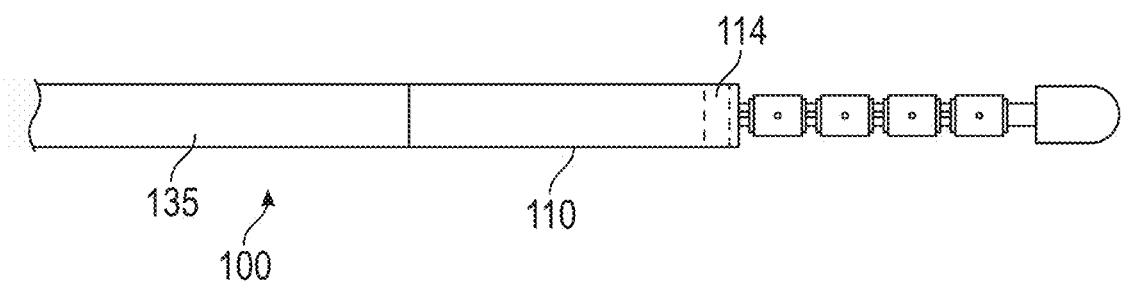
FIG. 2B illustrates a side view of the shock wave catheter of FIG. 2A with the retractable member in a retracted (open) configuration.

FIG. 2A illustrates a closed configuration of shock wave catheter 100 where a distal end of retractable enclosure 110 extends to distal member 120. In this configuration, retractable enclosure 110, at least in part, defines a chamber 112 that houses the shock wave emitter assembly 140. In some embodiments, chamber 112 is pressurized to a pressure of at least 1 atm in this closed configuration with a conductive fluid (e.g., saline). In some embodiments, chamber 112 is pressurized to a pressure of at most 5 atm. In some embodiments, chamber 112 is pressurized to a pressure that is no less than 2 atm and no greater than 4 atm. In some embodiments, retractable enclosure 110 is made of a material that does not expand when chamber 112 is pressurized to a pressure of up to 5 atm. Retractable enclosure 110 may extend distally from a distal end of a slidable elongate member 135, which may extend to a proximal region of the catheter 100. In some embodiments, as shown in FIGS. 2A and 2B, the slidable elongate member 135 may form an outer layer of the catheter 100. In some embodiments, the slidable elongate member 135 be configured to slide longitudinally (in the distal-proximal direction) between two fixed concentric layers of the catheter 100.

In some embodiments, in the closed configuration shown in FIG. 2A, one or more shock waves are generated in the conductive fluid at emitters 141, 142, 143, 144. The one or more shock waves propagate through the fluid in chamber 112 and through retractable enclosure 110 and then reach a target (e.g., a calcified lesion, a thrombotic mass, or a fibrotic mass), where the one or more shock waves break up the target.

In contrast, FIG. 2B illustrates an open configuration of catheter 100, according to one or more embodiments. In the open configuration, retractable enclosure 110 is spaced from the distal member 230. For example, the distal end of the retractable enclosure 110 may be spaced apart from the distal member 230 by a distance greater than or equal to 5 mm. In some embodiments, in the open configuration, a distal end of the retractable enclosure 110 is located more proximally than at least a part of shock wave emitter assembly 140. In some embodiments, and as shown in FIG. 2B, a distal end of the retractable enclosure 110 is located more proximally than emitters 141, 142, 143, 144.

In some embodiments, the effective sonic output of shock waves (i.e., the pressure exerted at the treatment site) may be higher in this open configuration than in the closed configuration. In some embodiments, shock wave emitter assembly 140, when used in the open configuration, generates one or more cavitation bubbles, which expand to a size greater than that which would be possible within an enclosure. The collapse of a cavitation bubble in the open configuration generates additional pressure waves (e.g., from high-speed micro-jets) with greater energy than those generated from a cavitation bubble inside an enclosure. In some embodiments, depending on the acoustic properties of the enclosure, sonic output from a shock wave may be dampened upon propagation through an enclosure. As a result, catheter 100 may be employed in the open configuration when shock waves generated in the closed configuration do not sufficiently or efficiently treat target tissue.

In some embodiments, catheter 100 is connected (e.g., electrically or electromagnetically) to a power source. Depending on the intended use (e.g., in an open configuration or in a closed configuration), power supplied by the power source to catheter 100 may be adjusted or modulated to treat target tissue more effectively. In some embodiments, the power source may be a high voltage power supply and, depending on the intended use, properties of the supplied voltage pulse may be adjusted. For example, the amplitude of the voltage pulse may be increased or decreased when catheter 100 is switched from an open configuration to a closed configuration. In another example, the pulse width of a high voltage pulse may be adjusted to target a specific type of tissue (e.g., calcific, fibrotic, or thrombotic) or to be compatible with shock wave generation and propagation through a specific medium (e.g., saline or blood). In some embodiments, other pulse parameters (e.g., number of pulses, frequency, or number of IVL treatment cycles) may be optimized for a target tissue type and/or whether catheter 100 is intended for use in an open or closed configuration.

In some embodiments, retractable enclosure 110 is made of a tubular membrane. Retractable enclosure 110 may be made of a polyether block amide (e.g., Pebax), a nylon, a thermoplastic polyurethane (TPU), a fluorinated ethylene propylene (FEP), a polytetrafluoroethylene (PTFE), or a low durometer resin. Retractable enclosure 110 may have an outer diameter that is less than 15 mm, allowing catheter 100 to navigate through narrower and/or more tortuous body lumens than would be possible with conventional IVL devices. In some embodiments, retractable enclosure 110 has a length (i.e., in the catheter's distal-proximal direction) that is no less than a length of shock wave emitter assembly 140 (e.g., a distance from proximal end of emitter 141 to distal end of emitter 144. In some embodiments, retractable enclosure 110 has a length between 3 mm and 100 mm. In some embodiments, retractable enclosure 110 has a length between 10 mm and 50 mm.

Figure 3A:
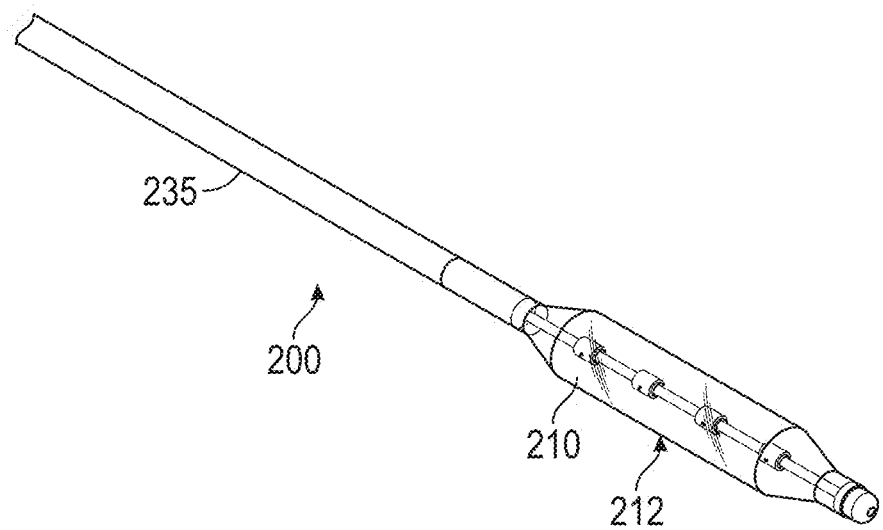
FIG. 3A illustrates a perspective view of an exemplary shock wave catheter having a retractable enclosure in a sealed (closed) configuration, according to aspects of the disclosure.
Figure 3B:
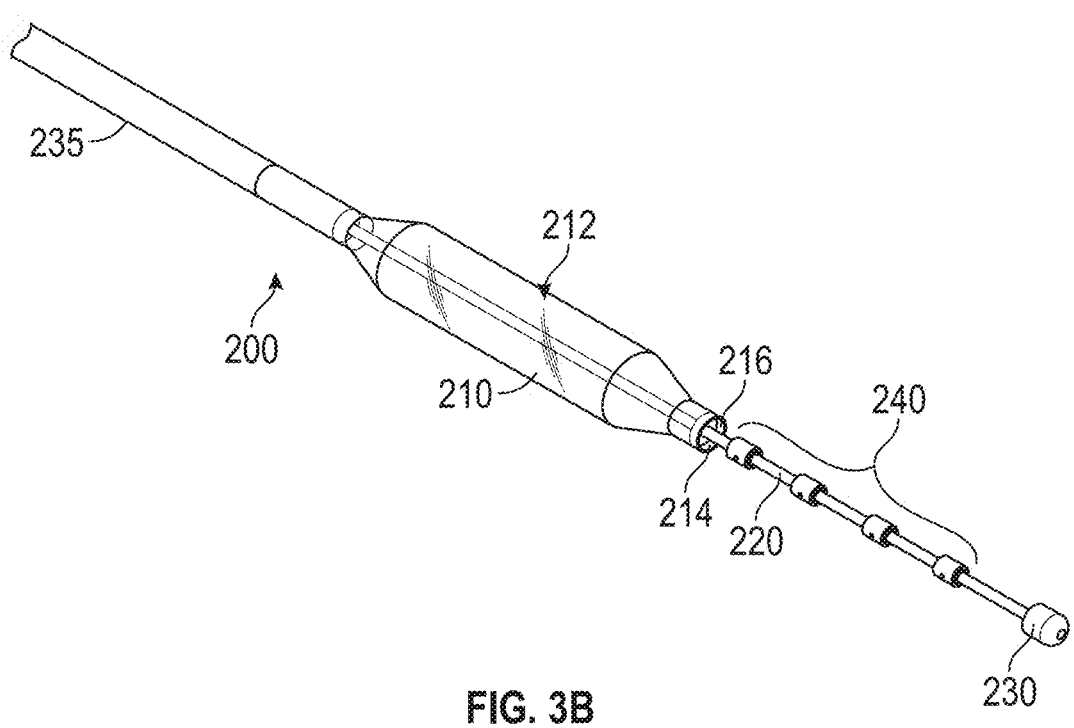
FIG. 3B illustrates a perspective view of the shock wave catheter of FIG. 3A with the retractable enclosure in a retracted (open) configuration.

FIGS. 3A and 3B illustrate a distal region of a shock wave catheter 200, according to one or more embodiments of the disclosure. Catheter 200 includes a retractable enclosure 210 that is retractable from a closed configuration (illustrated in FIG. 3A) to an open configuration (illustrated in FIG. 3B). The retractable enclosure 210 is attached to a distal region of a slidable elongate member 235, which extends to a proximal end of the catheter 200. In the closed configuration, retractable enclosure 210 surrounds and houses a shock wave emitter assembly 240 that is located on an elongate member 220. In some embodiments, retractable enclosure 210 includes a central region 212 that expands in diameter when inflated with a fluid. In some embodiments, retractable enclosure 210 is an angioplasty balloon. In some embodiments, retractable enclosure 210 includes a distal opening 216 having an inner diameter that is no less than a maximum profile of shock wave emitter assembly 240. In some embodiments, the inner diameter of the distal opening is no less than 5 mm.

In some embodiments, the retractable enclosure 210 includes, at an inner surface of its distal end, a polymeric liner 214 that, when coupled to a distal member 230 in the closed configuration, forms a fluid-tight seal. The fluidic seal may be formed by filling and pressuring the retractable enclosure 210 (e.g., to a pressure greater than 1 atm) such that an expandable member (e.g., an expandable dome or an expandable cone) of the distal member 230 seals with the polymeric liner 214. The polymeric liner 214, may be made of a compliant, low-durometer material.

In some embodiments, the retractable enclosure 210 may be used to exert outward pressure at the treatment site (e.g., along walls of a body lumen) after generation of shock waves. For example, shock waves may be generated at shock wave emitter assembly 240 with retractable enclosure 210 in a closed configuration. These shock waves may be generated with retractable enclosure 210 inflated to no more than 5 atm with a conductive fluid (e.g., saline). After shock wave generation, retractable enclosure 210 may be inflated to a pressure greater than 5 atm to achieve lumen dilation.

In another example, shock waves may be generated at shock wave emitter assembly 240 with retractable enclosure 210 in an open configuration. After shock wave generation, retractable enclosure 210 may be moved distally to the closed configuration. Upon sealing of retractable enclosure 210 to distal member 230, retractable enclosure 210 may be inflated (e.g., to a pressure greater than 5 atm) to achieve lumen dilation.

Figure 4:
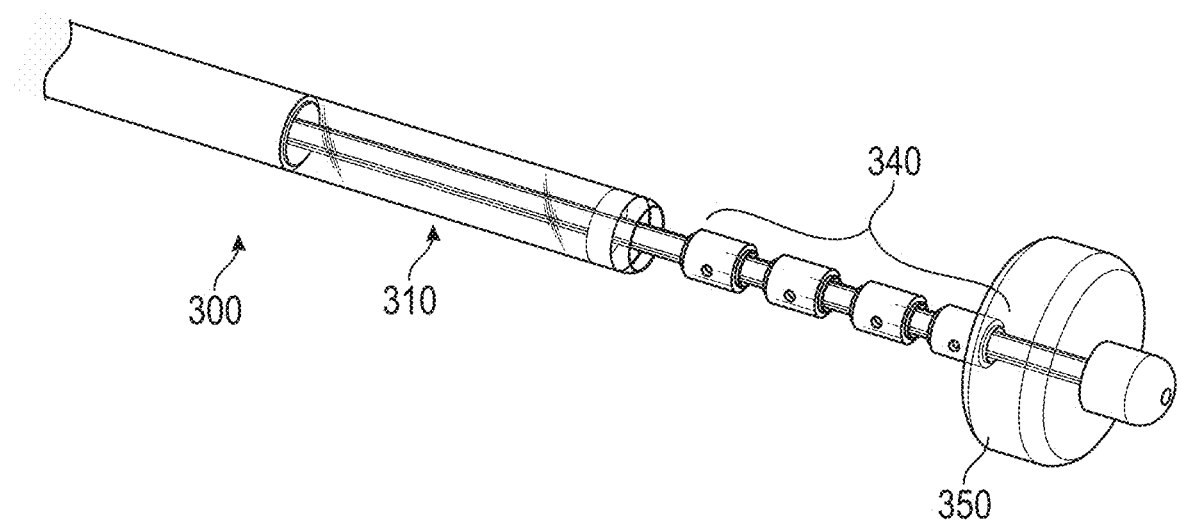
FIG. 4 illustrates a perspective view of an exemplary shock wave catheter having an inflatable distal member, according to aspects of the disclosure.

FIG. 4 illustrates a distal region of another exemplary shock wave catheter 300, according to one or more embodiments. Similar to catheters 100 and 200 described above, catheter 300 includes a retractable enclosure 310 that may be moved to generate shock waves from shock wave emitter assembly 340 in either a closed configuration or an open configuration. Catheter 300 additionally includes an occlusion member 350 located distally of shock wave emitter assembly 340. Occlusion member 350 may be an expandable enclosure (e.g., an expandable balloon). In some embodiments, occlusion member 350 is made of a compliant, low durometer material. Occlusion member 350 may be made, for example, from a polyether block amide or a nylon material. Occlusion member 350 may be in a deflated or collapsed state during navigation through a body lumen and delivery to a treatment site. After positioning the shock wave emitter assembly 340 at the treatment site, occlusion member 350 may be expanded to occlude the body lumen and prevent flow of any debris generated during treatment to other parts of the patient's body. Occlusion member 350 may have a collapsed diameter and an inflated diameter greater than the collapsed diameter. In some embodiments, occlusion member 350 may be inflated by filling the member with a fluid via a fluid lumen, which may be separate from a fluid lumen for filling (and/or inflating) retractable enclosure 310. In some embodiments, an IVL catheter may include a distal occlusion member (e.g., occlusion member 350) and a proximal occlusion member, located proximally of a shock wave emitter assembly. In some embodiments, the use of one or more occlusion members to block debris flow may only be necessary when the IVL catheter is in an open configuration.

In some embodiments, an IVL catheter (e.g., catheter 100, 200, or 300) includes a fluid supply lumen and a return lumen for flushing a treatment site with a fluid (e.g., saline) during IVL therapy. In some embodiments, fluid supply and return to the distal region of the catheter may be performed with a single lumen. In other words, a lumen that is used to fill or inflate a retractable enclosure may be used to evacuate any debris generated during shock wave treatment. Such infusion, aspiration, and suction features may be necessary particularly when the catheter is used in an open configuration when an enclosure is not positioned between the treatment site and the shock wave emitter assembly. In such examples, debris may be generated at the treatment site in response to a higher sonic pressure (relative to a closed configuration). Infusion of a conductive fluid via the supply line may ensure consistent sparking at one or more electrode pairs of the emitter assembly. In some embodiments, the infusion and/or aspiration rates at the treatment site are 5 mL/min to 25 mL/min.

Figure 5:
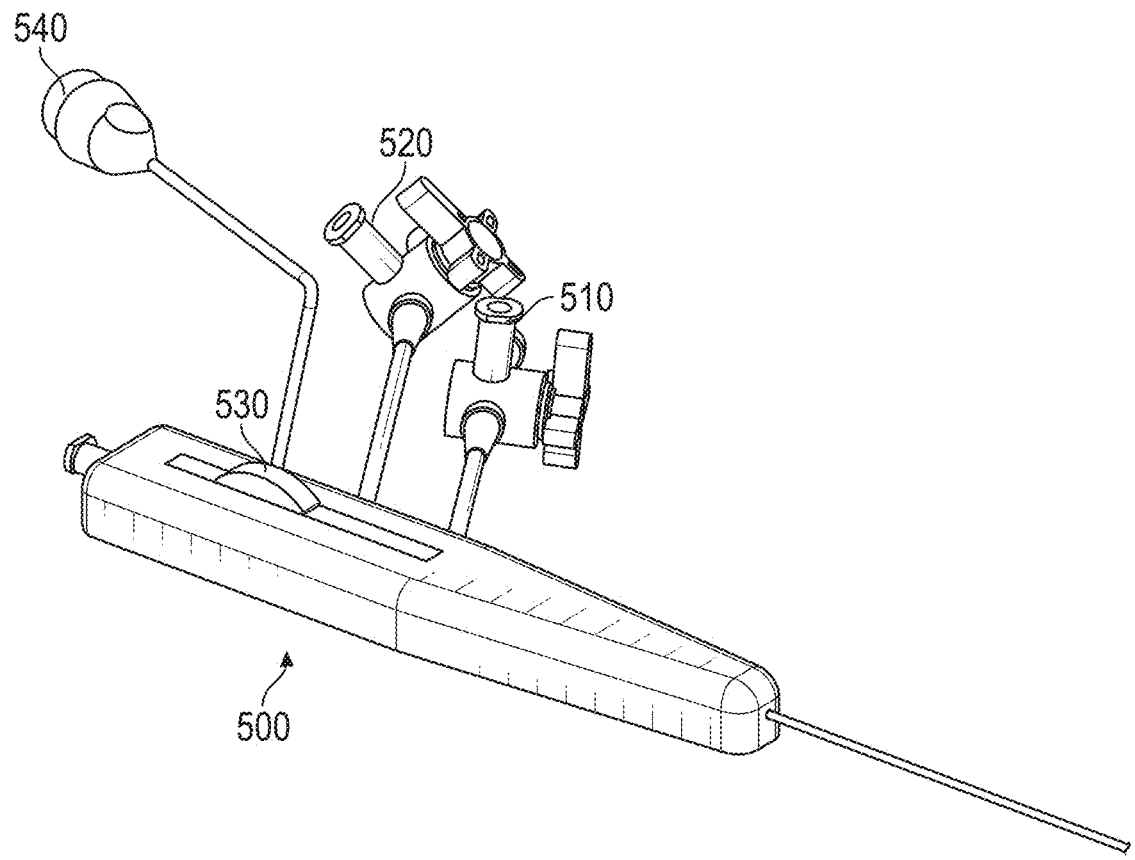
FIG. 5 illustrates a proximal region of an exemplary shock wave catheter, according to aspects of the disclosure.

Supply and/or return lumens may extend from a distal region of an IVL catheter to a proximal region of the IVL catheter. FIG. 5 illustrates an exemplary proximal handle 500 located in a proximal region of an IVL catheter, according to one or more embodiments. Proximal handle 500 may include an infusion port 510 that is in fluid communication with a supply lumen of the catheter and an aspiration port 520 that is in fluid communication with a return lumen of the catheter. One or both of the infusion port 510 and the aspiration port 520 may be fluidically connected to one or more pumps (e.g., syringe pumps or peristaltic pumps). The infusion port 510 may be in fluid communication with a fluid source for supplying conductive fluid (e.g., saline) to the treatment site (e.g., to fill and/or inflate an enclosure in a closed configuration or to flow fresh fluid to emitters in an open configuration). The proximal handle includes a power connector 540 through which a power source (not shown) may be connected. In some embodiments, the power source may be a high voltage generator. In some embodiments, the power source may be a light source (e.g., a laser).

In some embodiments, the proximal handle 500 includes a switch 530 that is operably connected to a retractable enclosure, such as retractable enclosure 210 of catheter 200 of FIG. 3B, to move the retractable enclosure between a closed configuration to an open configuration. For example, a retractable enclosure may be connected to or integrally formed with an elongate member that extends to the switch 530. Such an elongate member may be slidably located externally to an inner elongate member, such as externally to elongate member 220 of catheter 200 of FIG. 3B.

In some embodiments, switch 530 may be movable (e.g., manually) to two or more stops corresponding to different positions of the retractable enclosure. In some embodiments, switch 530 may be slidable between two or more stops corresponding to different positions of the retractable enclosure. In some embodiments, switch 530 is movable between a first stop corresponding to a closed configuration of the retractable enclosure and a second stop corresponding to an open configuration of the retractable enclosure. In some embodiments, switch stops may correspond to a fully closed position, a fully retracted position, and one or more partially retracted positions of the retractable enclosure. For example, in embodiments of a shock wave emitter assembly having a plurality of emitters, different stop positions for the switch may correspond to different numbers of emitters being surrounded by the retractable enclosure.

Figure 6:
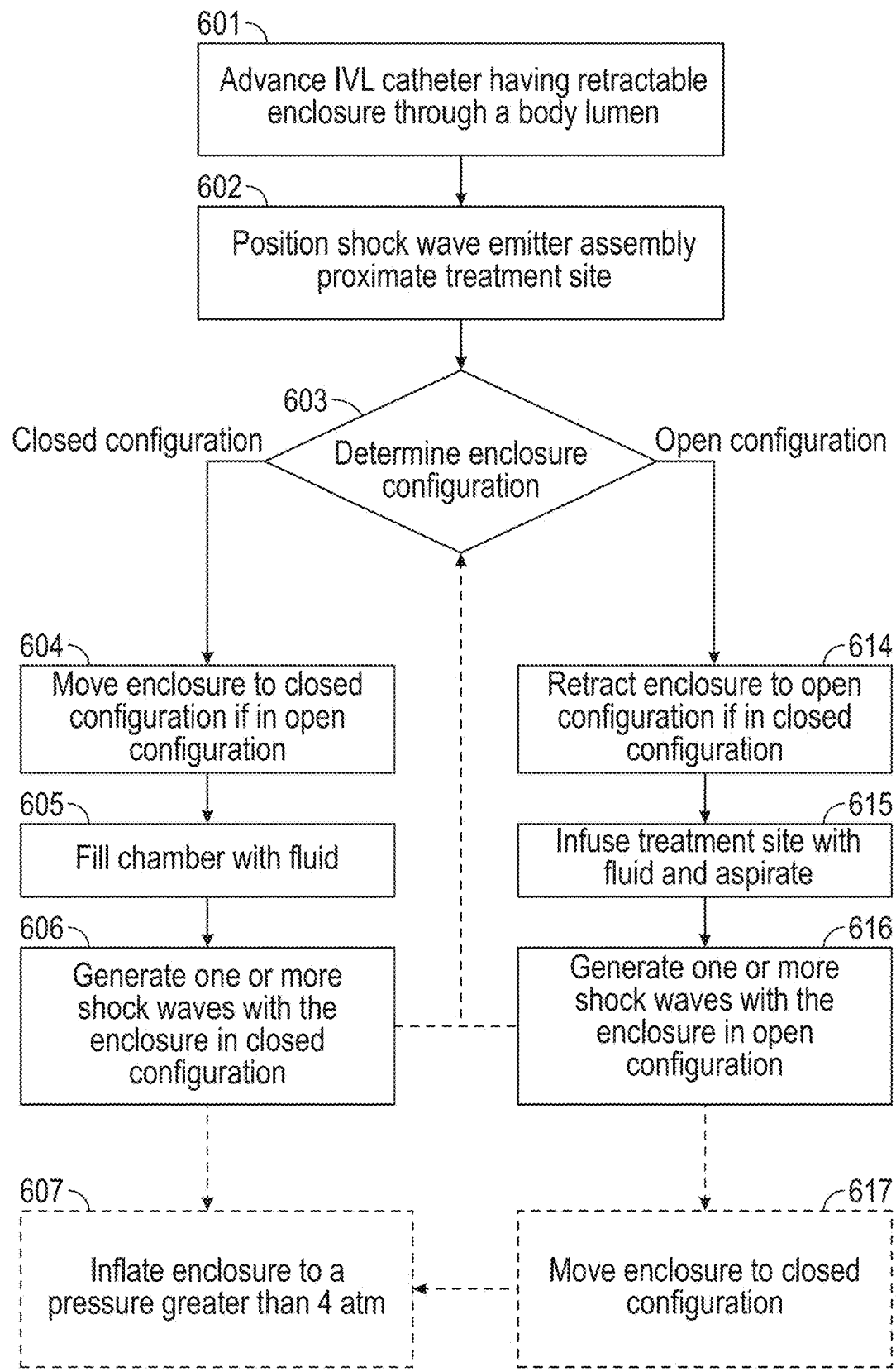
FIG. 6 illustrates an exemplary method of generating shock waves, according to aspects of the disclosure.

FIG. 6 is a flowchart illustrating a method of using an IVL catheter with a retractable enclosure, according to some embodiments. At step 601, the IVL catheter is advanced through a body lumen (e.g., a blood vessel). The retractable enclosure may be a tubular membrane, an angioplasty balloon, or another type of enclosure. During delivery in some embodiments, the enclosure is in a closed configuration. In some embodiments, the enclosure may be in a collapsed or deflated state to ensure a smaller cross-sectional profile during navigation through potentially tortuous body lumens. In some embodiments, the enclosure is in an open configuration during delivery.

At step 602, the catheter may be positioned such that a shock wave emitter assembly (enclosed by the retractable enclosure in the closed configuration) of the catheter is proximate to a target treatment site. In some embodiments, the treatment site is imaged by one or more of x-ray fluoroscopy, intravascular ultrasound, or optical coherent tomography, and the catheter is positioned based on imaging data.

In some embodiments, at step 603, the user (e.g., a physician) or an automated algorithm may determine whether the enclosure should be in a closed configuration or an open configuration depending on factors such as type of tissue being targeted, thickness of target lesion, eccentricity of target lesion, distance from target lesion, or other factors. In the open configuration, the effective sonic output may be substantially greater than in the closed configuration.

If the catheter is to be used with the enclosure in a closed configuration, at step 604, the enclosure may be moved to a closed configuration if it is in an open configuration. In the closed configuration, a seal may be formed between a distal end of the enclosure and a distal member of the catheter. The distal member may include an expandable feature that may be expanded (e.g., by filling and pressuring the enclosure with a fluid) to create a seal that can withstand an internal pressure greater than 1 atm. The enclosure may be moved by the switch at the proximal handle of the catheter. The enclosure may be moved by a switch at a proximal handle of the catheter.

At step 605, the chamber is filled with a fluid (e.g., saline) via a fluid lumen of the catheter. In some embodiments, the chamber is pressurized to a pressure no greater than 5 atm with the fluid. In some embodiments, the chamber is pressurized to a pressure that is no less than 2 atm and no greater than 4 atm.

At step 606, shock waves are generated in the enclosure from the shock wave emitter assembly. In some embodiments, shock waves are generated by applying a high voltage across one or more electrode pairs of the shock wave emitter assembly. In other embodiments, shock waves are generated by light energy directed to the shock wave emitter assembly (e.g., by an optical fiber).

At step 607, in some embodiments, the enclosure is optionally inflated to a pressure greater than 4 atm to achieve body lumen dilation.

In some embodiments, if the catheter is to be used with the enclosure in an open configuration, at step 614, the enclosure may be retracted if it is in a closed configuration. The enclosure may be fully retracted to expose all of the shock wave emitter assembly, or partially retracted to partially expose the shock wave emitter assembly. The enclosure may be moved by the switch at the proximal handle of the catheter.

At step 615, the target site may be infused with fluid (e.g., saline). In some embodiments, the site is also aspirated. The catheter may include separate supply and return lumens to enable infusion and aspiration. In some embodiments, a single lumen is used for both fluid supply and return. In some embodiments, before step 615, the treatment site may be isolated within the vasculature by one or more expandable occlusion members (e.g., located distally and/or proximally of the treatment site) to ensure containment and aspiration of any debris generated during treatment.

At step 616, one or more shock waves are generated at the shock wave emitter assembly. As noted above, shock waves generated in the open configuration may have an effective higher sonic output than in the closed configuration. That is, the acoustic pressure from shock waves generated in step 616 may be higher than the acoustic pressure from shock wave generated in step 606.

After shock wave treatment, in some embodiments, the enclosure may optionally be moved to the closed configuration at step 617. As in step 604, a seal capable of withstanding an internal pressure greater than 1 atm may be formed in the closed configuration. Following closing the enclosure, in some embodiments, the enclosure is inflated to a pressure that is greater than 4 atm at step 607.

After shock wave treatment at step 606 or 616, optionally, step 603 may be repeated to switch the enclosure configuration and generate additional shock waves if necessary.

Figure 7:
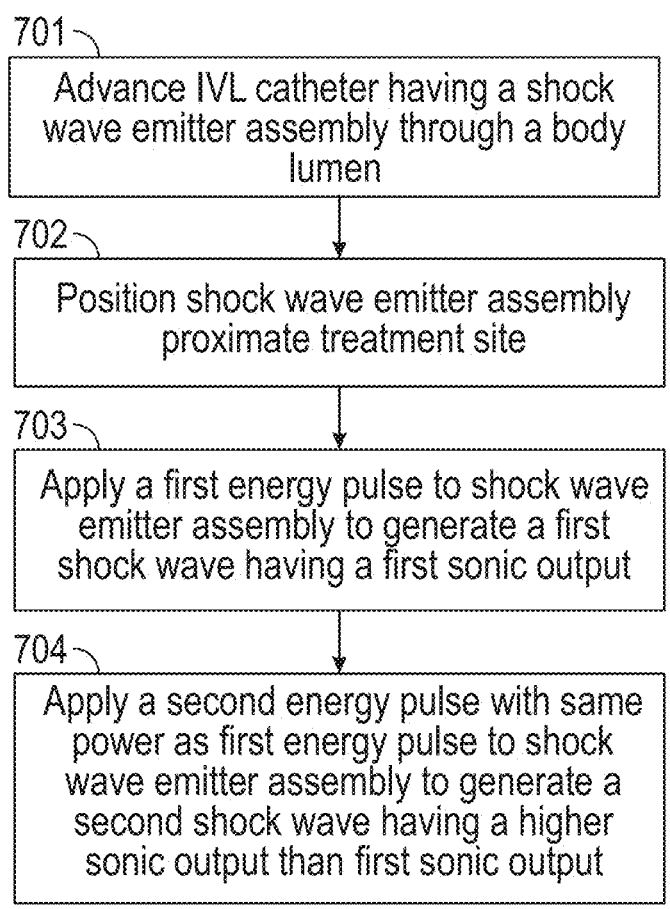
FIG. 7 illustrates an exemplary method of generating shock waves, according to aspects of the disclosure.

FIG. 7 is a flowchart illustrating a method of using an IVL catheter system including an IVL catheter configured to generate shock waves having different sonic outputs, according to some embodiments. At step 701, the IVL catheter having a shock wave emitter assembly is advanced through a body lumen. At step 702, the shock wave emitter assembly is positioned proximate to a treatment site (e.g., at a lesion of the body lumen).

In some embodiments, the body lumen is imaged (e.g., by x-ray fluoroscopy, optical coherence tomography, or intravascular ultrasound) to help position the catheter proximate to the lesion at step 702. In some embodiments, the lesion is characterized (e.g., by an imaging method) to determine an appropriate therapy for the lesion (e.g., IVL catheter pulsing algorithm or IVL catheter configuration). For example, a preferred therapy to treat an eccentric lesion may be different from a preferred therapy to treat a concentric lesion. Further, different tissue types (e.g., calcific lesions or thrombotic lesions) having different acoustic properties may require different sonic treatment profiles to optimally treat a specific tissue type.

At step 703, a first energy pulse is applied to the shock wave emitter assembly to generate a first shock wave having a first sonic output. The shock wave emitter assembly may include a plurality of shock wave emitters, where each of the shock wave emitters generates a separate shock wave.

At step 704, a second energy pulse is applied to the shock wave emitter assembly to generate a second shock wave having a second sonic output higher than the first sonic output. The second energy pulse has the same power as the first energy pulse; for example, the first and second energy pulses may have the same voltage.

In some embodiments, between steps 703 and 704, the IVL catheter system is changed from a first setting to a second setting. In some embodiments, in the first setting of the system, the IVL catheter is in a first configuration. In the second setting, the IVL catheter may be in a second configuration. In the first configuration, a retractable enclosure of the IVL catheter may be closed and, in the second configuration, the retractable enclosure may be open. In other embodiments, the IVL catheter system is changed from the first setting to the second setting by modifying electrical settings of the system.

Figure 8:
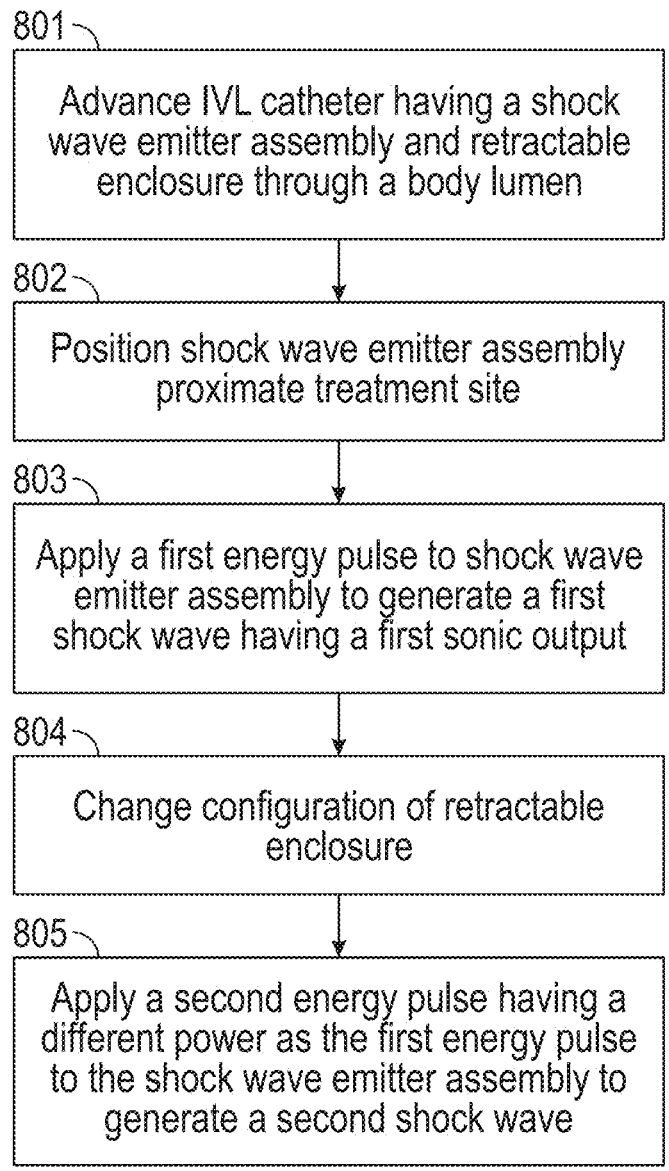
FIG. 8 illustrates an exemplary method of generating shock waves, according to aspects of the disclosure.

FIG. 8 is a flowchart illustrating a method of using an IVL catheter system including an IVL catheter configured to generate shock waves having different sonic outputs, according to some embodiments. At step 801, an IVL catheter having a shock wave emitter assembly and a retractable enclosure through a body lumen. At step 802, the shock wave emitter assembly is positioned proximate to a treatment site (e.g., a lesion of the body lumen).

At step 803, a first energy pulse is applied to the shock wave emitter assembly to generate a first shock wave having a first sonic output.

At step 804, the IVL catheter is changed from a first configuration to a second configuration.

At step 805, a second energy pulse having a different power than the first energy pulse is applied to the shock wave emitter assembly to generate a second shock wave. In some embodiments, the second shock wave has a sonic output equal to the first shock wave. In some embodiments, the second shock wave has a sonic output greater than the first shock wave. The power of the energy pulse may be changed at a power generator.

According to aspects of the disclosure, a method for manufacturing shock wave catheters may include: providing an inner elongate member; mounting one or more shock wave emitters at a distal end of the inner member; electrically connecting the one or more shock wave emitters to one or more wires; immobilizing the one or more wires to the inner member; providing a retractable member (e.g., a retractable enclosure) that is slidable along the inner member to surround the one or more shock wave emitters when the retractable member is in a distal-most position and to expose the one or more shock wave emitters when the retractable member is retracted from the distal-most position; and providing an outer member. The method may further include sterilizing (e.g., by electron beam sterilization or another form of radiation sterilization) components of the shock wave catheter.

According to aspects of the disclosure, a method of refurbishing a shock wave catheter may include replacing or repairing one or more components of the catheter, such as one or more of a retractable member, a distal member, an inner elongate member, and a slidable elongate member. For example, a retractable member may be replaced by detaching the retractable member from a slidable elongate member and attaching a new elongate member for the slidable elongate member. This may include sliding the slidable elongate member at least partially off of the catheter. In some variations, the retractable member may be refurbished either in place or after having been removed from the catheter. Refurbishment of the retractable member may include, for example, replacing or repairing a distal sealing region of the retractable enclosure. Refurbishing of a catheter may include replacing one or more components of a shock wave emitter assembly. This can include replacing one or more wires or removing a portion of one or more wires and soldering a new wire to the remaining portion and/or replacing one or more emitter sheaths. Optionally, an entire electrode assembly is removed from the catheter, repaired, and reassembled to the catheter. Optionally, an entire electrode assembly may be removed and replaced. Optionally, refurbishing a shock wave emitter assembly may include testing one or more performance parameters of a refurbished shock wave emitter. Testing may include testing the ability of the retractable member to seal to the distal member of the catheter, such as by positioning the retractable member in a sealed position, applying a pressure to the retractable member, and measuring the pressure to determine whether the applied pressure is above a predetermined threshold pressure. Testing may include testing the shock wave emitter assembly, such as by applying one or more voltage pulses to the shock wave emitter assembly and observing whether sparks are formed and/or measuring an intensity of the resulting shock waves. Testing may include testing the integrity of the retractable member by, e.g., pressurizing the retractable member in a closed position and monitoring pressure loss.

Figure 9:
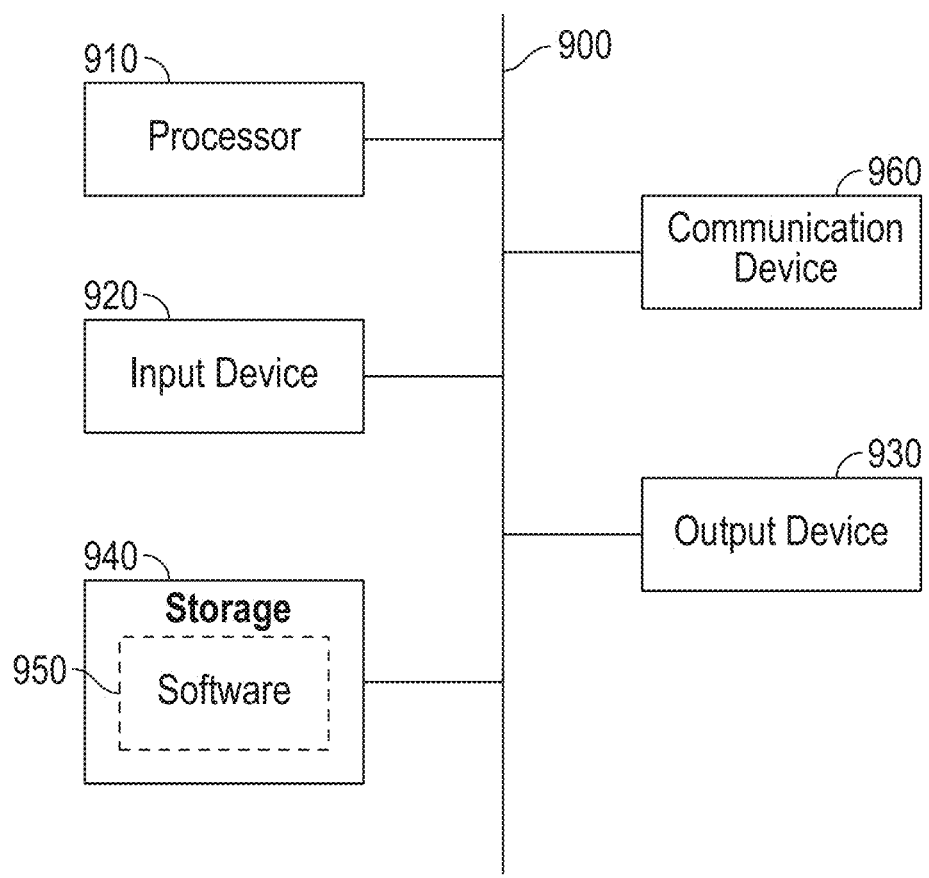
FIG. 9 illustrates an exemplary computing system that may be included as part of a shock wave catheter system, according to aspects of the disclosure.

FIG. 9 illustrates an exemplary computing system 900 that may be included as part of a shock wave catheter system, in accordance with some examples of the disclosure. System 900 can be a client or a server. As shown in FIG. 9, system 900 can be any suitable type of processor-based system, such as a personal computer, workstation, server, handheld computing device (portable electronic device) such as a phone or tablet, or dedicated device. The system 900 can include, for example, one or more of input device 920, output device 930, one or more processors 910, storage 940, and communication device 960. Input device 920 and output device 930 can generally correspond to those described above and can either be connectable to, or integrated with, the computer.

Input device 920 can be any suitable device that provides input, such as a touch screen, keyboard or keypad, mouse, gesture recognition component of a virtual/augmented reality system, or voice-recognition device. Output device 930 can be or include any suitable device that provides output, such as a display, touch screen, haptics device, virtual/augmented reality display, or speaker.

Storage 940 can be any suitable device that provides storage, such as an electrical, magnetic, or optical memory including a RAM, cache, hard drive, removable storage disk, or other non-transitory computer readable medium. Communication device 960 can include any suitable device capable of transmitting and receiving signals over a network, such as a network interface chip or device. The components of the system 900 can be connected in any suitable manner, such as via a physical bus or wirelessly.

Processor(s) 910 can be any suitable processor or combination of processors, including any of, or any combination of, a central processing unit (CPU), graphics processing unit (GPU), field programmable gate array (FPGA), programmable system on chip (PSOC), and application-specific integrated circuit (ASIC). Software 950, which can be stored in storage 940 and executed by one or more processors 910, can include, for example, the programming that embodies the functionality or portions of the functionality of the present disclosure (e.g., as embodied in the devices as described above). The processor(s) 910 may be configured to process data received from sensors (e.g., imaging sensors, pressure sensors, or temperature sensors). The processor(s) 910 may be configured to control movement of a retractable enclosure of a shock wave catheter based, at least in part, on data received from the sensors and/or input from a user.

Software 950 can also be stored and/or transported within any non-transitory computer-readable storage medium for use by, or in connection with, an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by, or in connection with, an instruction execution system, apparatus, or device.

Software 950 can also be propagated within any transport medium for use by, or in connection with, an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by, or in connection with, an instruction execution system, apparatus, or device. The transport computer readable medium can include, but is not limited to, an electronic, magnetic, optical, electromagnetic, or infrared wired or wireless propagation medium.

System 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Although shock wave devices described herein generate shock waves based on high voltage applied to electrodes, it should be understood that a shock wave device additionally or alternatively may comprise a laser and optical fibers as a shock wave emitter system whereby the laser source delivers energy through an optical fiber and into a fluid to form shock waves and/or cavitation bubbles.

Although the electrode assemblies and catheter devices described herein have been discussed primarily in the context of treating coronary occlusions, such as lesions in vasculature, the electrode assemblies and catheters herein can be used for a variety of occlusions, such as occlusions in the peripheral vasculature (e.g., above-the-knee, below-the-knee, iliac, or carotid). For further examples, similar designs may be used for treating soft tissues, such as cancer and tumors (i.e., non-thermal ablation methods), blood clots, fibroids, cysts, organs, scar and fibrotic tissue removal, or other tissue destruction and removal. Electrode assembly and catheter designs could also be used for neurostimulation treatments, targeted drug delivery, treatments of tumors in body lumens (e.g., tumors in blood vessels, the esophagus, intestines, stomach, or vagina), wound treatment, non-surgical removal and destruction of tissue, or used in place of thermal treatments or cauterization for venous insufficiency and fallopian ligation (i.e., for permanent female contraception).

In one or more examples, the electrode assemblies and catheters described herein could also be used for tissue engineering methods, for instance, for mechanical tissue decellularization to create a bioactive scaffold in which new cells (e.g., exogenous or endogenous cells) can replace the old cells; introducing porosity to a site to improve cellular retention, cellular infiltration/migration, and diffusion of nutrients and signaling molecules to promote angiogenesis, cellular proliferation, and tissue regeneration similar to cell replacement therapy. Such tissue engineering methods may be useful for treating ischemic heart disease, fibrotic liver, fibrotic bowel, and traumatic spinal cord injury (SCI). For instance, for the treatment of SCI, the devices and assemblies described herein could facilitate the removal of scarred spinal cord tissue, which acts like a barrier for neuronal reconnection, before the injection of an anti-inflammatory hydrogel loaded with lentivirus to genetically engineer the spinal cord neurons to regenerate.

The elements and features of the exemplary electrode assemblies and catheters discussed above may be rearranged, recombined, and modified, without departing from the present invention. Furthermore, numerical designators such as "first", "second", "third", "fourth", etc. are merely descriptive and do not indicate a relative order, location, or identity of elements or features described by the designators. For instance, a "first" shock wave may be immediately succeeded by a "third" shock wave, which is then succeeded by a "second" shock wave. As another example, a "third" emitter may be used to generate a "first" shock wave and vice versa. Accordingly, numerical designators of various elements and features are not intended to limit the disclosure and may be modified and interchanged without departing from the subject invention.

It should be noted that the elements and features of the example catheters illustrated throughout this specification and drawings may be rearranged, recombined, and modified without departing from the present invention. For instance, while this specification and drawings describe and illustrate catheters having several example balloon designs, the present disclosure is intended to include catheters having a variety of balloon configurations. The number, placement, and spacing of the electrode pairs of the shock wave generators can be modified without departing from the subject invention. Further, the number, placement, and spacing of balloons of catheters can be modified without departing from the subject invention.

It should be understood that the foregoing is only illustrative of the principles of the invention, and that various modifications, alterations, and combinations can be made by those skilled in the art without departing from the scope and spirit of the invention. Any of the variations of the various catheters disclosed herein can include features of any other catheters or combination of catheters described herein. Furthermore, any of the methods can be used with any of the catheters disclosed. Accordingly, it is not intended that the invention be limited, except as by the appended claims.

EXEMPLARY EMBODIMENTS

The following embodiments are exemplary and are not intended to limit the scope of any invention described herein.

Embodiment 1. A catheter for emitting shock waves in a body lumen, the catheter comprising:
- a distal member;
- a slidable elongate member having a proximal end and a distal end;
- an inner elongate member located at least partially inside of the slidable elongate member and extending to the distal member;
- a shock wave emitter assembly located on the inner elongate member and in a more distal location than the distal end of the slidable elongate member; and
- a retractable enclosure having a distal end, where:
- in a closed configuration, the distal end of the retractable enclosure extends to the distal member of the catheter, and
- in an open configuration, the distal end of the retractable enclosure is retracted from the distal member of the catheter.

Embodiment 2. The catheter of embodiment 1, further comprising a proximal handle having a switch that is operably coupled with the retractable enclosure to move the retractable enclosure between the closed configuration and the open configuration.

Embodiment 3. The catheter of embodiment 2, wherein the slidable elongate member comprises a first lumen and the proximal handle comprises a first port in fluid communication with the first lumen.

Embodiment 4. The catheter of embodiment 3, wherein the slidable elongate member further comprises a second lumen and the proximal handle further comprises a second port in fluid communication with the second lumen.

Embodiment 5. The catheter of embodiment 3 or 4, wherein the proximal handle further comprises a second port in fluid communication with the first lumen.

Embodiment 6. The catheter of any one of embodiments 1-5, wherein, in the closed configuration, the distal end of the retractable enclosure and the distal member of the catheter form a seal.

Embodiment 7. The catheter of embodiment 6, wherein the distal member comprises an expandable member, the distal end of the retractable enclosure comprises a polymeric liner, and, in the closed configuration, the seal is formed between the expandable member and the polymeric liner.

Embodiment 8. The catheter of embodiment 7, wherein the polymeric liner comprises a polytetrafluoroethylene.

Embodiment 9. The catheter of any one of embodiments 1-8, wherein, in the closed configuration, the catheter further comprises a chamber surrounding the shock wave emitter assembly and having an internal pressure no less than 1 atm.

Embodiment 10. The catheter of any one of embodiments 1-9, wherein the distal member comprises an expandable member located distally of the retractable enclosure.

Embodiment 11. The catheter of any one of embodiments 1-10, wherein the retractable enclosure comprises at least one of polyether block amide, nylon, thermoplastic polyurethane, fluorinated ethylene propylene, and polytetrafluoroethylene.

Embodiment 12. The catheter of any one of embodiments 1-11, wherein the distal member comprises an elastic tip.

Embodiment 13. The catheter of any one of embodiments 1-12, further comprising at least one fluid lumen having a distal opening adjacent the shock wave emitter assembly.

Embodiment 14. The catheter of any one of embodiments 1-13, wherein, in the open configuration, the distal end of the retractable enclosure is spaced apart from the distal member of the catheter by a distance greater than or equal to 5 mm.

Embodiment 15. The catheter of any one of embodiments 1-14, wherein, in the open configuration, the distal end of the retractable enclosure is at least partially located proximally of the shock wave emitter assembly.

Embodiment 16. The catheter of any one of embodiments 1-15, wherein the retractable enclosure comprises an angioplasty balloon.

Embodiment 17. The catheter of embodiment 16, wherein the retractable enclosure includes a distal end opening with an inner diameter no less than a maximum outer diameter of the shock wave emitter assembly.

Embodiment 18. The catheter of embodiment 17, wherein the inner diameter of the distal end opening of the retractable enclosure is no less than 5 mm.

Embodiment 19. The catheter of any one of embodiments 16-18, wherein, in the closed configuration, the retractable enclosure surrounds the shock wave emitter assembly and has an internal pressure no less than 1 atm and no more than 4 atm.

Embodiment 20. The catheter of any one of embodiments 16-19, wherein the retractable enclosure comprises at least one of polyether block amide and polytetrafluoroethylene.

Embodiment 21. The catheter of any one of embodiments 16-20, further comprising at least one fluid lumen having a distal opening adjacent the shock wave emitter assembly.

Embodiment 22. The catheter of any one of embodiments 16-21, wherein, in the open configuration, a distal end opening of the retractable enclosure is spaced apart from the distal member of the catheter by a distance greater than or equal to 5 mm.

Embodiment 23. A method of generating shock waves in a body lumen, the method comprising:
- advancing a shock wave catheter through the body lumen, the shock wave catheter having:
  - a distal member;
  - an elongate member;
  - a shock wave emitter assembly located at a distal region of the elongate member; and
  - a retractable enclosure having a distal end and configured to be retractably coupled to the distal member;
- positioning the shock wave emitter assembly adjacent a treatment site;
- retracting the retractable enclosure; and
- generating one or more shock waves at the shock wave emitter assembly.

Embodiment 24. The method of embodiment 23, further comprising closing the retractable enclosure such that the distal end of the retractable enclosure is sealed to the distal member.

Embodiment 25. The method of embodiment 23 or 24, further comprising depressurizing a chamber of the retractable enclosure such that a fluid-tight seal between the distal member and the retractable enclosure is broken.

Embodiment 26. The method of any one of embodiments 23-25, further comprising imaging the treatment site by one or more of x-ray fluoroscopy, intravascular ultrasound, and optical coherence tomography.

Embodiment 27. The method of embodiment 26, further comprising, based on imaging data, determining whether to generate shock waves with the retractable enclosure retracted or with the retractable enclosure sealed to the distal member.

Embodiment 28. A method of generating shock waves, the method comprising:
- advancing a shock wave catheter through a body lumen, the shock wave catheter having a shock wave emitter assembly;

applying a first energy pulse to the shock wave emitter assembly to generate a first shock wave having a first sonic output; and after applying the first energy pulse, applying a second energy pulse having the same power as the first energy pulse to the shock wave emitter assembly to generate a second shock wave having a second sonic output that is greater than the first sonic output.

Embodiment 29. The method of embodiment 28, wherein the shock wave catheter comprises a distal member, an elongate member, and a retractable enclosure having a distal end and configured to be retractably coupled to the distal member.

Embodiment 30. The method of embodiment 29, further comprising, between applying the first energy pulse and applying the second energy pulse, retracting the retractable enclosure such that the retractable enclosure does not cover the shock wave emitter assembly.

Embodiment 31. A catheter system for generating shock waves, the catheter system comprising:
a power source configured to generate a plurality of energy pulses, each energy pulse having a predetermined power; and
a catheter comprising a shock wave emitter assembly and an elongate energy guide extending from the power source to the shock wave emitter assembly,
where, in a first setting of the catheter system, the shock wave emitter assembly generates a first shock wave having a first sonic output when a first energy pulse of the plurality of energy pulses is applied to the shock wave emitter assembly, and, in a second setting of the catheter system, the shock wave emitter assembly generates a second shock wave having a second sonic output greater than the first sonic output when a second energy pulse of the plurality of energy pulses is applied to the shock wave emitter assembly.

Embodiment 32. The catheter system of embodiment 31, wherein the catheter further comprises a distal member and a retractable enclosure that, in the first setting, is sealed to the distal member so as to define a chamber and, in the second setting, is spaced from the distal member.

Embodiment 33. A method of generating shock waves, the method comprising:
advancing a shock wave catheter through a body lumen, the shock wave catheter having a shock wave emitter assembly and a retractable enclosure;
applying a first energy pulse to the shock wave emitter assembly to generate a first shock wave having a first sonic output;
if the retractable enclosure is in a closed configuration, retracting the retractable enclosure to expose the shock wave emitter assembly, or, if the retractable enclosure is in an open configuration, closing the retractable enclosure to enclose the shock wave emitter assembly; and applying a second energy pulse having a different power than the first energy pulse to the shock wave emitter assembly to generate a second shock wave.

The invention claimed is:

1. A catheter for emitting shock waves in a body lumen, the catheter comprising:
a distal member;
a slidable elongate member having a proximal end and a distal end;
an inner elongate member located at least partially inside of the slidable elongate member and extending to the distal member;
a shock wave emitter assembly located on the inner elongate member and in a more distal location than the distal end of the slidable elongate member; and
a retractable enclosure having a distal end,
where:
in a closed configuration, the distal end of the retractable enclosure extends to the distal member of the catheter to form a seal, and
in an open configuration, the distal end of the retractable enclosure is retracted from the distal member of the catheter.

2. The catheter of claim 1, further comprising a proximal handle having a switch that is operably coupled with the retractable enclosure to move the retractable enclosure between the closed configuration and the open configuration.

3. The catheter of claim 2, wherein the slidable elongate member comprises a first lumen and the proximal handle comprises a first port in fluid communication with the first lumen.

4. The catheter of claim 3, wherein the slidable elongate member further comprises a second lumen and the proximal handle further comprises a second port in fluid communication with the second lumen.

5. The catheter of claim 3, wherein the proximal handle further comprises a second port in fluid communication with the first lumen.

6. The catheter of claim 1, wherein the distal member comprises an expandable member, the distal end of the retractable enclosure comprises a polymeric liner, and, in the closed configuration, the seal is formed between the expandable member and the polymeric liner.

7. The catheter of claim 6, wherein the polymeric liner comprises a polytetrafluoroethylene.

8. The catheter of claim 1, wherein, in the closed configuration, the catheter further comprises a chamber surrounding the shock wave emitter assembly and having an internal pressure no less than 1 atm.

9. The catheter of claim 1, wherein the distal member comprises an expandable member located distally of the retractable enclosure.

10. The catheter of claim 1, wherein the retractable enclosure comprises polyether block amide, nylon, thermoplastic polyurethane, fluorinated ethylene propylene, polytetrafluoroethylene, or a combination thereof.

11. The catheter of claim 1, wherein the distal member comprises an elastic tip.

12. The catheter of claim 1, further comprising at least one fluid lumen having a distal opening adjacent the shock wave emitter assembly.

13. The catheter of claim 1, wherein, in the open configuration, the distal end of the retractable enclosure is spaced apart from the distal member of the catheter by a distance greater than or equal to 5 mm.

14. The catheter of claim 1, wherein, in the open configuration, the distal end of the retractable enclosure is at least partially located proximally of the shock wave emitter assembly.

15. The catheter of claim 1, wherein the retractable enclosure comprises an angioplasty balloon.

16. The catheter of claim 15, wherein the retractable enclosure includes a distal end opening with an inner diameter no less than a maximum outer diameter of the shock wave emitter assembly.

17. The catheter of claim 16, wherein the inner diameter of the distal end opening of the retractable enclosure is no less than 5 mm.

18. The catheter of claim 15, wherein, in the closed configuration, the retractable enclosure forms a chamber surrounding the shock wave emitter assembly, the chamber having an internal pressure no less than 1 atm and no more than 4 atm.

19. The catheter of claim 15, wherein the retractable enclosure comprises polyether block amide, polytetrafluoroethylene, or a combination thereof.

20. The catheter of claim 15, further comprising at least one fluid lumen having a distal opening adjacent the shock wave emitter assembly.

21. The catheter of claim 15, wherein, in the open configuration, a distal end opening of the retractable enclosure is spaced apart from the distal member of the catheter by a distance greater than or equal to 5 mm.

22. A catheter system for generating shock waves, the catheter system comprising:
   a power source configured to generate a plurality of energy pulses, each energy pulse having a predetermined power; and
   a catheter comprising a shock wave emitter assembly and an elongate energy guide extending from the power source to the shock wave emitter assembly,
   where, in a first setting of the catheter system, the shock wave emitter assembly generates a first shock wave having a first sonic output when a first energy pulse of the plurality of energy pulses is applied to the shock wave emitter assembly, and, in a second setting of the catheter system, the shock wave emitter assembly generates a second shock wave having a second sonic output greater than the first sonic output when a second energy pulse of the plurality of energy pulses is applied to the shock wave emitter assembly, and
   wherein the catheter further comprises a distal member and a retractable enclosure that, in the first setting, is sealed to the distal member so as to define a chamber and, in the second setting, is spaced from the distal member.

23. The system of claim 22, wherein the catheter comprises:
   a slidable elongate member; and
   an inner elongate member located at least partially inside of the slidable elongate member and extending to the distal member,
   wherein the shock wave emitter assembly is located on the inner elongate member and in a more distal location than a distal end of the slidable elongate member.

24. The system of claim 23, wherein the catheter further comprises a proximal handle having a first port, and the slidable elongate member comprises a first lumen in fluid communication with the first lumen.

25. The system of claim 24, wherein the proximal handle further comprises a second port, and the slidable elongate member further comprises a second lumen in fluid communication with the second port.

26. The system of claim 24, wherein the proximal handle further comprises a second port in fluid communication with the first lumen of the slidable elongate member.

27. The system of claim 22, wherein the catheter further comprises a proximal handle having a switch that is operably coupled with the retractable enclosure to move the retractable enclosure between the first setting and the second setting.

28. The system of claim 22, wherein the distal member comprises an expandable member, the distal end of the retractable enclosure comprises a polymeric liner, and, in the first setting, the expandable member and the polymeric liner are sealed.

29. The system of claim 22, wherein the distal member comprises an expandable member located distally of the retractable enclosure.

30. The system of claim 22, wherein the distal member comprises an elastic tip.

31. The system of claim 22, wherein, in the first setting, the retractable enclosure forms a chamber surrounding the shock wave emitter assembly, the chamber having an internal pressure no less than 1 atm and no more than 4 atm.

32. The system of claim 22, wherein the catheter further comprises at least one fluid lumen having a distal opening adjacent the shock wave emitter assembly.

33. The system of claim 22, wherein, in the second setting, a distal end of the retractable enclosure is spaced apart from the distal member of the catheter by a distance of greater than or equal to 5 mm.

34. The system of claim 22, wherein, in the second setting, a distal end of the retractable enclosure is at least partially located proximally of the shock wave emitter assembly.

35. The system of claim 22, wherein the retractable enclosure comprises a distal end opening having an inner diameter no less than a maximum outer diameter of the shock wave emitter assembly.

36. The system of claim 35, wherein the inner diameter of the distal end opening of the retractable enclosure is no less than 5 mm.

37. The system of claim 22, wherein the power source is configured to adjust an amplitude, a pulse width, a frequency, a number of treatment cycles, a number of pulses generated by the shock wave emitter assembly, or a combination thereof between the first setting and the second setting.

* * * * *